United States Patent
Miller

(10) Patent No.: US 9,788,169 B1
(45) Date of Patent: Oct. 10, 2017

(54) MESH ARCHITECTURE FOR DISTRIBUTED TELECOMMUNICATION SYSTEMS

(71) Applicant: Genband US LLC, Plano, TX (US)

(72) Inventor: Paul Miller, Derry, NH (US)

(73) Assignee: Genband US LLC, Plano, TX (US)

( * ) Notice: Subject to any disclaimer, the term of this patent is extended or adjusted under 35 U.S.C. 154(b) by 0 days.

(21) Appl. No.: 15/294,384

(22) Filed: Oct. 14, 2016

(51) Int. Cl.
| H04L 12/725 | (2013.01) |
| H04W 4/06 | (2009.01) |
| H04W 76/00 | (2009.01) |
| H04W 76/02 | (2009.01) |

(52) U.S. Cl.
CPC ............ *H04W 4/06* (2013.01); *H04W 76/002* (2013.01); *H04W 76/02* (2013.01)

(58) Field of Classification Search
CPC ............. H04L 65/1006; H04L 65/1069; H04L 65/1016; H04L 65/80; H04M 7/006
See application file for complete search history.

(56) References Cited

U.S. PATENT DOCUMENTS

| 2015/0180781 A1* | 6/2015 | Poulin ................... H04L 47/125 370/235 |
| 2015/0229562 A1* | 8/2015 | Jenkins ................. H04L 45/306 370/218 |
| 2016/0021147 A1* | 1/2016 | Osmond ............. H04L 65/1016 370/312 |

* cited by examiner

*Primary Examiner* — Jamal Javaid
(74) *Attorney, Agent, or Firm* — Haynes and Boone, LLP; Thomas Kelton; Calmann Clements

(57) ABSTRACT

A method includes, with a first bearer node of a telecommunication component, utilizing network connections between the first bearer node and a first plurality of control nodes of the telecommunication component, the bearer node configured to process media data being transmitted between endpoints over a network. The method further includes, with a second bearer node of the telecommunication component, utilizing network connections between the second bearer node and a second plurality of control nodes of the telecommunication component, the second plurality of control nodes having at least one control node in common with the first plurality of control nodes and at least one control node not common with the first plurality of control nodes.

20 Claims, 18 Drawing Sheets

MESH ARCHITECTURE FOR DISTRIBUTED TELECOMMUNICATION SYSTEMS

BACKGROUND

The present disclosure relates generally to telecommunication systems, and more particularly to methods and systems for managing control and bearer traffic that is handled by a telecommunication system.

Telecommunication systems use various components to transfer data between endpoints. Such data may include audio data, video data, screen sharing data, and other types of media. Some of the components are physical pieces of hardware placed into the network. In some cases, Network Function Virtualization can be used to virtualize some of the applications performed previously by hardware appliances. One example of such a component is a Session Border Controller (SBC). An SBC may handle communication traffic across different networks. For example, the SBC may handle communication traffic being passed between a private network and a public network such as the Internet.

Conventional SBCs and other telecommunication components provide a number of different functions. For example, such components provide signaling functions. The signaling functions are responsible for establishing open sessions between different endpoints. Another function is a media transfer function. The media transfer function represents the transfer of media data from one endpoint to the other over the communication sessions established by the signaling function.

SBCs and other telecommunication functions may scale to meet demand. For example, as demand for services increases, additional components, either hardware or virtual, may be utilized. It is desirable to manage computing resources in an efficient manner.

SUMMARY

A method includes, with a first bearer node of a telecommunication component, utilizing network connections between the first bearer node and a first plurality of control nodes of the telecommunication component, the bearer node configured to process media data being transmitted between endpoints over a network. The method further includes, with a second bearer node of the telecommunication component, utilizing network connections between the second bearer node and a second plurality of control nodes of the telecommunication component, the second plurality of control nodes having at least one control node in common with the first plurality of control nodes and at least one control node not common with the first plurality of control nodes.

A system includes a telecommunication component having a plurality of control nodes, each of the control nodes configured to establish communication sessions between endpoints. The telecommunication component further includes a plurality of bearer nodes, each of the bearer nodes configured to process media data that is transmitted between endpoints, wherein a first one of the plurality of bearer nodes is configured to provide media resources to a first set of the plurality of control nodes, and a second one of the plurality of bearer nodes is configured to provide media resources to a second set of the plurality of control nodes, the first set and the second set having at least one common control node, and both the first set and the second set each include an exclusive control node.

A method includes, with a first control node of a telecommunication component, utilizing network connections between the first control node and a first plurality of bearer nodes of the telecommunication component, the control node configured to establish communication sessions between endpoints over a network. The method further includes, with a second control node of the telecommunication component, utilizing network connections between the second control node and a second plurality of bearer nodes of the telecommunication component, the second plurality of bearer nodes having at least one bearer node in common with the first plurality of bearer nodes and at least one bearer node not common with the first plurality of bearer nodes.

BRIEF DESCRIPTION OF THE DRAWINGS

Aspects of the present disclosure are best understood from the following detailed description when read with the accompanying figures.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to efficiently manage telecommunication resources. One way to increase efficiency is to separate a telecommunication component into multiple components with different functions. For example, a telecommunication component may be split into a control node and a bearer node. For example, an SBC may be split into a control node and a bearer node. The control node may perform a signaling function and the bearer node may perform a media transfer function. Distribution of these different functions may allow the telecommunication component to be more versatile. For example, remote location of a bearer node can reduce the requirements for bearer plane backhaul to centralized sites, reducing the cost of network operation for the service provider.

According to principles described herein, a telecommunication component is distributed into at least two different types of nodes, particularly, control nodes and bearer nodes. In one example, the first type of node may be a signaling node and the second type of node may be a media node. Additionally, each control node may be connected to one or more of the bearer nodes. Similarly, each one of the bearer nodes may be connected to one or more of the control nodes. In one example, a first bearer node may provide media services to a first plurality of control nodes. Similarly, a second bearer node may provide media services to a second plurality of control nodes. The first plurality of control nodes and second plurality of control nodes may have a common node as well as having nodes not included in the other plurality. Allowing control nodes and bearer nodes to connect in this manner allows for efficient use of resources.

Figure 1:
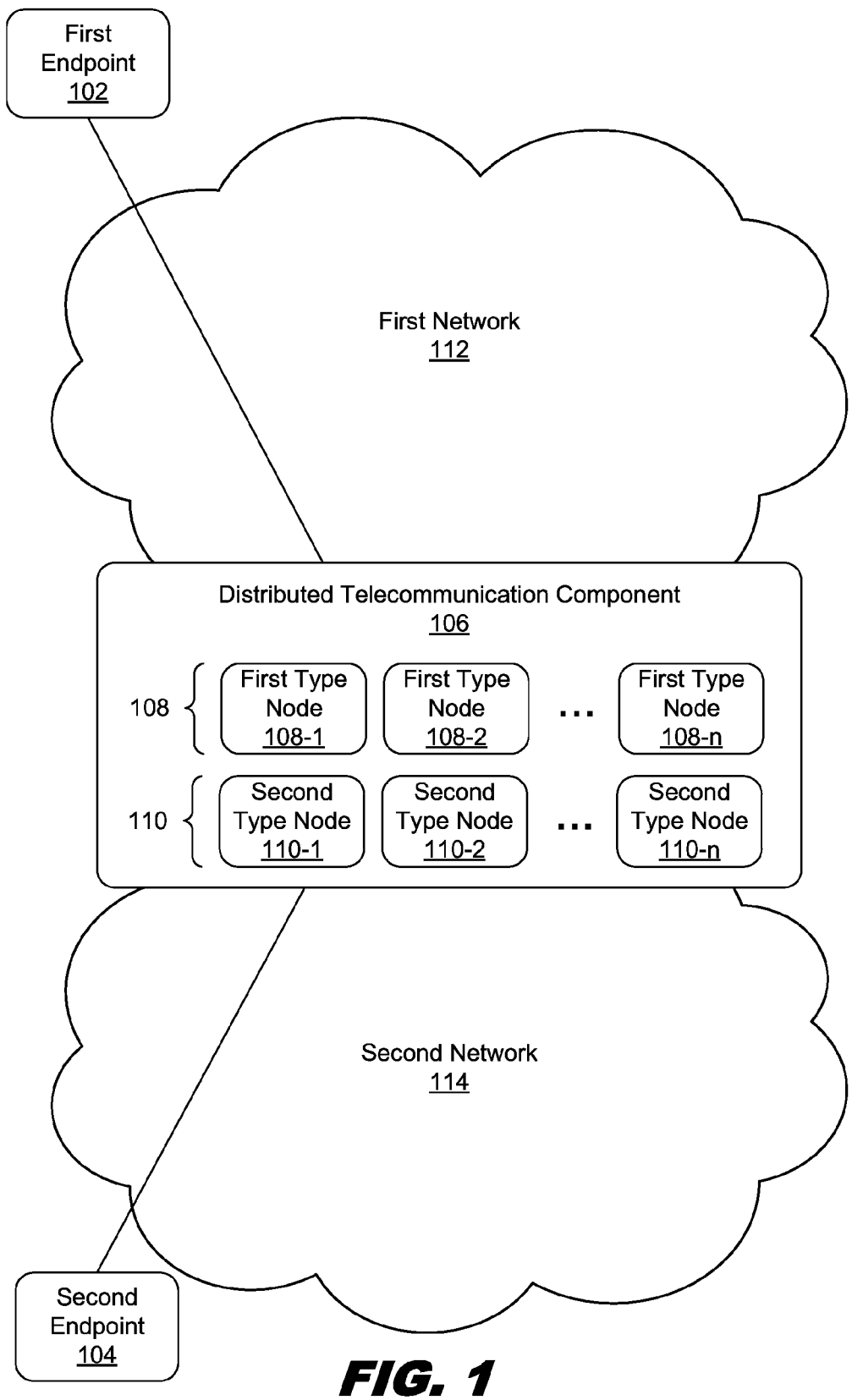
FIG. 1 is a diagram showing an illustrative distributed telecommunication component, according to one example or principles described herein.

FIG. 1 is a diagram showing an illustrative distributed telecommunication component 106. According to the present example, the distributed telecommunication component 106 handles traffic passing between a first network 112 and a second network 114. For example, the distributed telecommunication component may handle Voice over Internet Protocol (VoIP) traffic between a first endpoint 102 and a second endpoint 104.

In one example, the first network 112 may be a private network. A private network uses a private logical address (e.g., Internet Protocol (IP) address)). Such networks are typically used for a personal home network, an office network, or an enterprise Local Area Network (LAN). In some examples, the private network may be core network of a service provider. Endpoint devices such as endpoint 102 may be connected to the private network 112. The private network 112 may also be connected to a public network such as the Internet. The public network may also correspond to an access network. The access network may be a controller operator infrastructure such as a Data Over Cable Service Interface Specification (DOCSIS) cable access network or a Long Term Evolution (LTE) access network. The first network 112 may be connected to the second network 114 via a firewall or boundary function of the distributed telecommunication component 106.

The second network 114 may be a public network such as the Internet. Endpoint devices such as endpoint 104 may connect to the public second network 114 through an Internet service provider. Through both networks 112, 114, the endpoints may communicate. A telecommunication service may utilize telecommunication components such as the distributed telecommunication component 106 to process data passing between two different networks. The distributed telecommunication component may include several nodes, each node being able to handle a predefined number of subscribers. For example, each node may be able to handle 10,000 calls, simultaneous sessions, or endpoints.

The endpoints 102, 104 may be user devices such as desktop computers, laptop computers, mobile phones, or tablets. In some examples, the endpoints 102, 104 may be soft clients or any endpoint that is capable of interacting with a host service. In the present example, endpoint 102 is in communication with the distributed telecommunication component 106 through the first network 112. Endpoint 104 is in communication with the distributed telecommunication component 106 through the second network 114.

The distributed telecommunication component 106 includes a plurality of first type nodes 108 (108-1, 108-2 . . . 108-n) and a plurality of second type nodes 110 (110-1, 110-2 . . . 110-n). These nodes may be physical or virtual nodes, as will be explained in further detail below. In one example, the first type nodes are signaling nodes and the second type nodes 110 are media nodes. To establish a session between the two endpoints 102, 104, any one of the first type nodes 108 establishes a connection between the two endpoints. Then, any one of the second type nodes 110 may process traffic between the two endpoints.

Figure 2A:
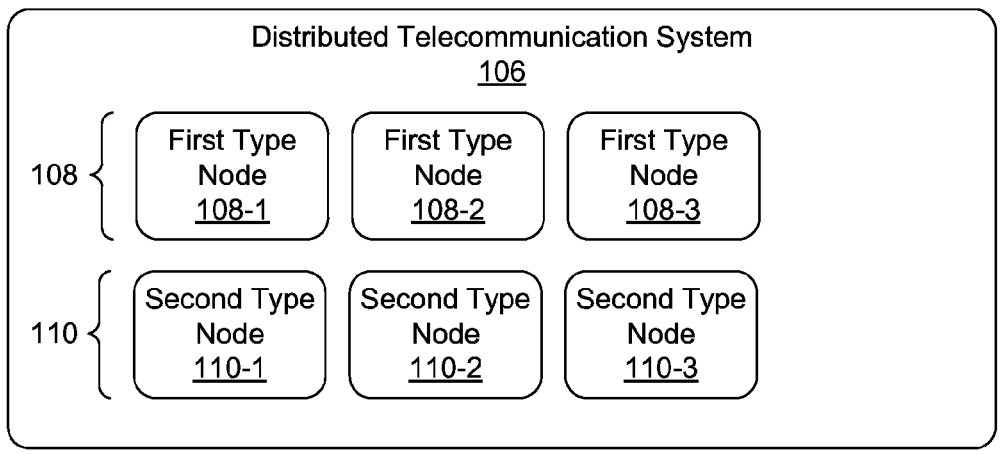
FIGS. 2A-2F are diagrams showing independent scaling of media and signaling nodes, according to one example of principles described herein.

FIGS. 2A-2F are diagrams showing independent scaling of control and bearer nodes. FIG. 2A illustrates an example in which there are currently three first type nodes 108-1, 108-2, 108-3. Additionally, there are currently three second type nodes 110-1, 110-2, 110-3.

Figure 2B:
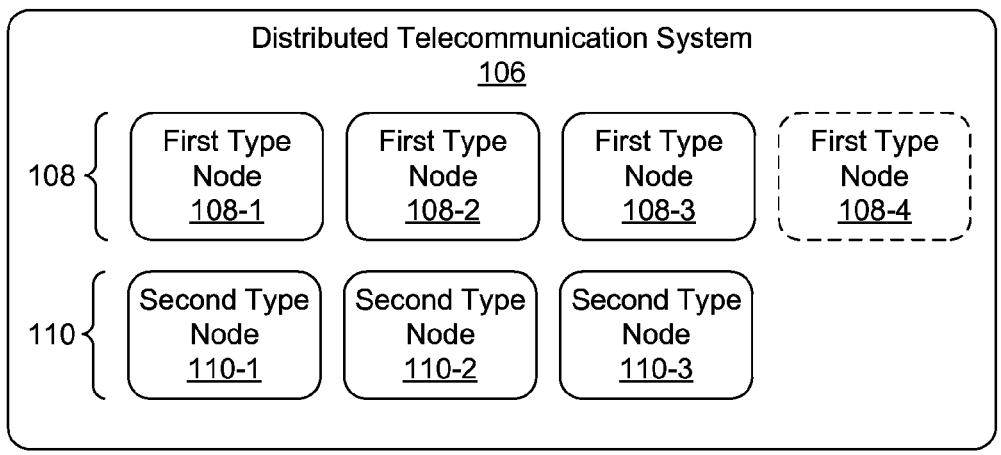

FIG. 2B illustrates scaling of the first type nodes. According to the present example, in response to a predetermined event, an additional first type node 108-4 is provisioned. This is done without adding an additional second type node 110. The predetermined event may be one of a variety of situations. In one example, demand for the function provided by the first type nodes (e.g., signaling) may rise above a predetermined threshold. This threshold may correspond to the capacity for the first three first type nodes 108-1, 108-2, 108-3. For example, if the first type nodes are signaling nodes, then when the usage of signaling capacity approaches a certain percentage (e.g., 90%) of full capacity, then the additional first type node 108-4 may be provisioned. In some cases, demand for the function provided by the first type nodes 108 may exceed a predefined threshold while the demand for the function provided by the second type node remains below a predetermined threshold. Thus, an additional first type node 108-4 is added without increasing the number of second type nodes 110.

Using a conventional, non-distributed telecommunication component, adding an additional node under similar circumstances would result in utilization of resources for both function types, even though resources for only one function type is needed. However, using principles described herein, an additional node may be provisioned without utilizing resources for an unneeded function.

Figure 2C:
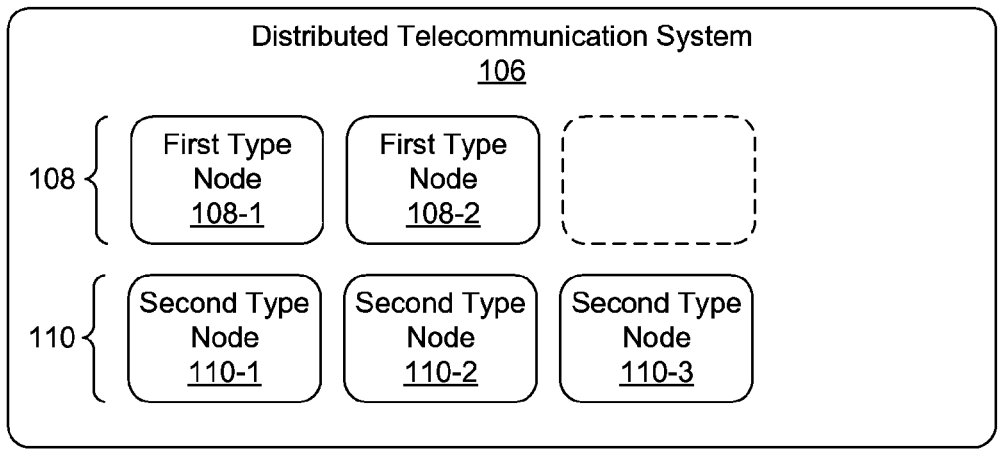

FIG. 2C also illustrates scaling of the first type nodes. In the present example, in response to a predetermined event, one of the first type nodes 108-3 is removed. This is done without removing or adding any of the second type nodes 110. A predetermined event may be, for example, demand for the function provided by the first type nodes falling below a predetermined threshold. In such case, it may be desirable to remove one of the first type nodes if it is not being utilized so that resources associated with that first type node 108-3 can be used elsewhere.

Figure 2D:
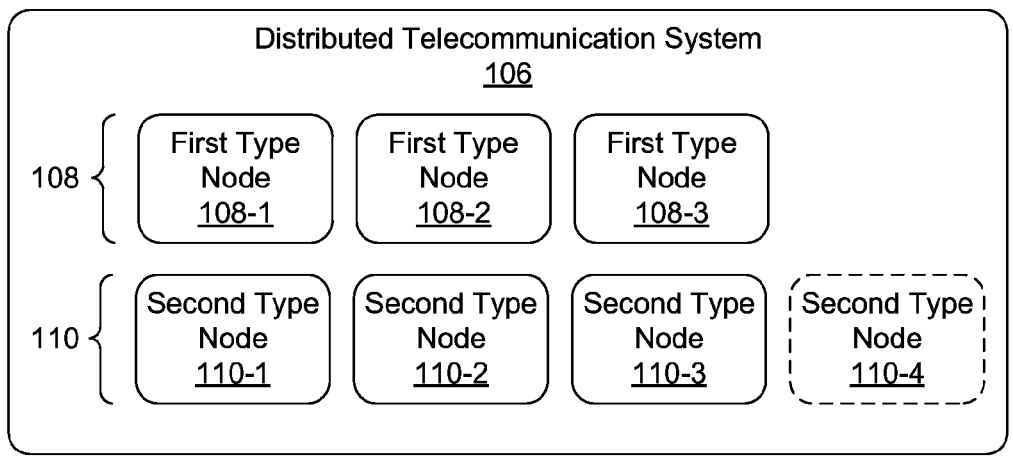

FIG. 2D illustrates scaling of the second type nodes 110. According to the present example, in response to a predetermined event, an additional second type node 110-4 is provisioned. This is done without adding an additional first type node 108. The predetermined event may be one of a variety of situations. In one example, demand for the function provided by the second type nodes (e.g., media signaling) may rise above a predetermined threshold. This threshold may correspond to the capacity for the first three second type nodes 110-1, 110-2, 110-3. For example, if the second type nodes 110 are media nodes, then when the usage of media transfer capacity approaches a certain percentage (e.g., 90%) of full capacity, then the additional second type node 110-4 may be provisioned. In some cases, demand for the function provided by the second type nodes 110 may exceed a predefined threshold while the demand for the function provided by the first type node remains below a predetermined threshold. Thus, an additional first type node 110-4 is added without changing or increasing the number of second type nodes 108.

Other predetermined events may cause additional scaling in the second type nodes. For example, it may be that the applications used to encode and transfer data across a communication session between two endpoints decide to use a new codec. A codec describes how audio/video data is to be encoded for transmission across a network. Different codecs may have different quality of service. In general, a higher quality transmission will utilize more network bandwidth and thus consume more resources of the media nodes. Thus, a switch to a different codec may increase demand for the functions provided by the media nodes 110.

Figure 2E:
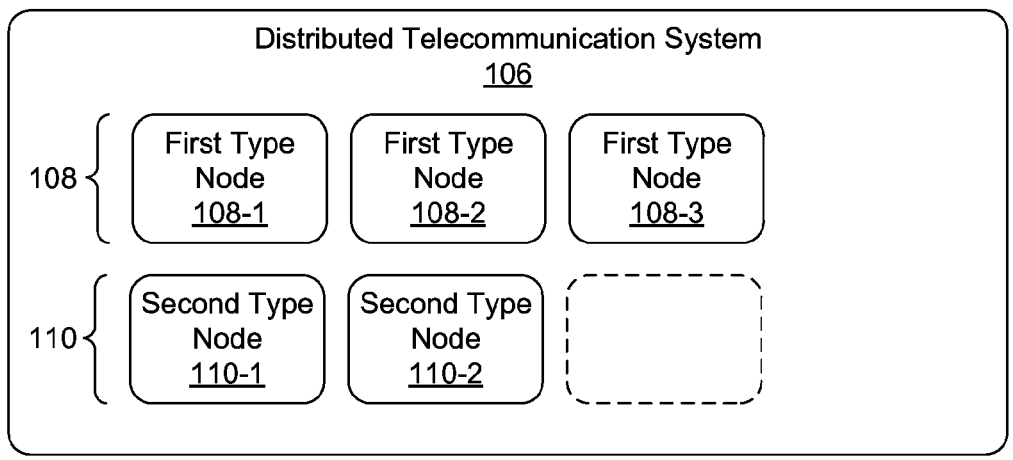

FIG. 2E also illustrates scaling of the second type nodes. In the present example, in response to a predetermined event, one of the second type nodes 110-3 is removed. This is done without removing or adding any of the first type nodes 108. A predetermined event may be, for example, demand for the function provided by the second type nodes 110 falling below a predetermined threshold. In such case, it may be desirable to remove one of the second type nodes if it is not being utilized so that resources associated with that second type node 110-3 can be used elsewhere. Another example of such an event is change to a codec that utilizes fewer resources of the second type nodes 110.

Figure 2F:
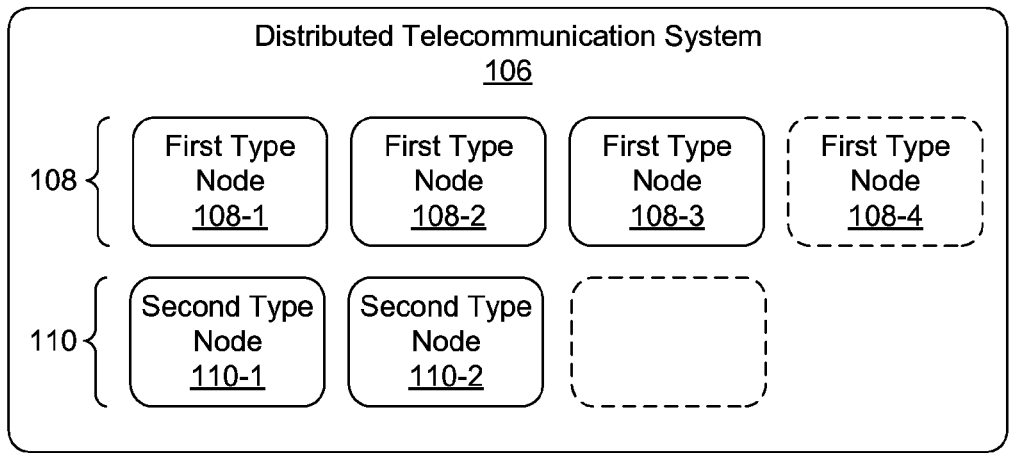

FIG. 2F illustrates an example in which one type of node scales upward while another type of node scales downward. In the present example, an additional first type node 108-4 is added while one of the second type nodes 110 is removed. The alternate situation in which an additional second type node is added while one of the first type nodes is removed may also occur. This may occur in response to two predetermined events, one event being associated with the first type nodes 108 and the other event being associated with the second type nodes. For example, demand for signaling services may exceed a predetermined threshold while demand for media services may fall below a predetermined threshold.

Other examples of predetermined events that may trigger independent scaling of two different types of nodes may include different application use. For example, a communication session may be established by the first type nodes. As media is being transferred across that communication session, an additional application may seek to use that same communication session. In such cases, the additional application may utilize more or fewer resources from either type of node, thus triggering a change in the total number of nodes.

As mentioned above, some of the nodes 108, 110 may be physical nodes. Such nodes are embodied as physical pieces of hardware that are physically connected to the network. In some examples, some of the nodes 108, 110 may be virtual nodes. Such nodes may be embodies as virtual network functions (VNFs) within a network function virtualization infrastructure.

Figure 3:
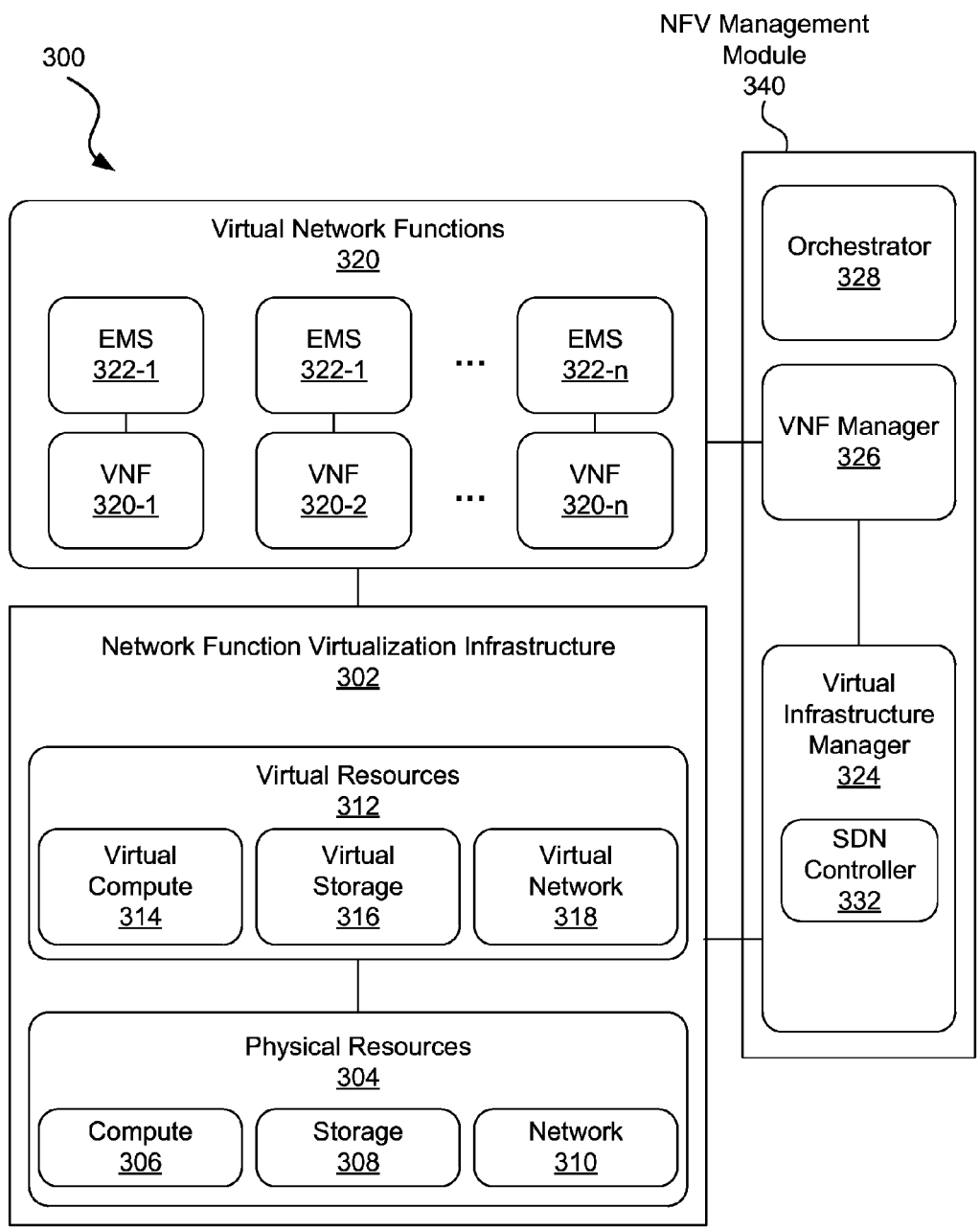
FIG. 3 is a diagram showing Network Function Virtualization, according to one example of principles described herein.

FIG. 3 is a diagram showing network function virtualization 300. In some examples, the network function virtualization 300 may correspond to network function virtualization as defined by the European Telecommunications Standards Institute (ETSI). According to the present example, a Network Function Virtualization Infrastructure (NFVI) 302 is used to provide network function virtualization 300. The NFVI 302 provides the infrastructure for a number of VNFs 320. Both the VNFs 320 and the NFVI 302 are managed by an NFV management module 340.

The NFVI 302 includes a set of physical resources 304 that are used to provide a set of virtual resources 312. The physical resources 304 include computing resources 306, storage resources 308, and network resources 310. Other resources, such as input/output resources are contemplated as well. The physical resources 304 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 306 include a plurality of processors within a plurality of physical computing systems. The processors are designed to process machine readable instructions to perform specifically designed tasks. The processors can be designed to work together to provide parallel processing capabilities.

The storage resources 308 include various types of memory. Some types of memory, such as non-volatile types of memory, typically have large storage volume but relatively slow performance. The storage resources 308 may include a series of hard disk drives or solid state drives that store data in the form of machine readable instructions as well as large amounts of data. The storage resources 308 may also include volatile forms of memory, such as those used for Random Access Memory (RAM), which are optimized for speed and are often referred to as "working memory."

The network resources 310 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 304 use hypervisors to provide a virtual computing environment that provides the virtual resources 312. Specifically, the hypervisors provide virtual hardware to guest operating systems. A physical computing system may provide one or more virtual machines for use by guest operating systems. The virtual resources 312 include virtual computing resources 314, virtual storage resources 316, and virtual network resources 318. Such virtual resources 312 may emulate their underlying physical resource counterparts.

The virtual computing resources 314 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 316 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 312 can be interconnected to each other through one or more virtual networks that make up the virtual networking resources 318. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 302 is managed by an infrastructure manager 324, which is part of the NFV management module 340. The infrastructure manager 324 may operate under a set of pre-defined rules that instruct the infrastructure manager how to manage the NFVI 302. Such rules may be adjusted by a human operator as desired. For example, such rules may instruct the infrastructure manager 324 how to provision additional virtual machines when instructed to do so. The infrastructure manager 324 may include hardware, software, or a combination of both to perform various management functions. For example, the infrastructure manager 324 may be an application that resides on one or more physical machines and can receive input from human administrators as well as other management functions. The infrastructure manager 324 can then manage the physical and virtual environment as appropriate. For example, if it is determined that more virtual machines are desired, then the infrastructure manager 324 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 324 can also take such physical computing systems out of standby mode when more computing power is desired.

In the present example, the infrastructure manager 324 includes at least an SDN controller 332. The virtual infrastructure manager 324 is responsible for managing the cloud computing environment provided by the virtual resources 312 of the NFVI 302. For example, the virtual infrastructure manager 324 may be responsible for provisioning additional virtual machines within the cloud computing environment when instructed to do so. The virtual infrastructure manager 324 may have access to a set of pre-defined rules. Such rules may be configured and/or defined by a human administrator. Such rules may be stored as a data structure in physical memory. In one example, such rules may instruct the virtual infrastructure manager 324 how to tear down a virtual machine when instructed to do so. One example of a virtual infrastructure manager 324 includes the open-source cloud computing software platform provided by the Openstack Foundation under the name OpenStack™. The virtual infrastructure manager 324 may also include other components. For example, the virtual infrastructure manager 324 may include OpenStack™ services such as Nova™ Neutron™, Keystone™, and Glance™.

The SDN controller 332 is used to control the network resources of the NFVI 302. The SDN controller 332 may control both the physical network resources 310 and the virtual network resources 318. As will be described in further detail below, the SDN controller 332 receives instructions from various applications for how to configure the network infrastructure. The SDN controller 332 may have access to a set of pre-defined rules. Such rules may be configured and/or defined by a human administrator. Such rules may be stored as a data structure in physical memory. One example of a rule used by the SDN controller 332 may be how to establish virtual network connections when instructed to do so.

As described above, a VNF 320 represents a virtualization of specific telecommunication functions that are typically performed by specialized pieces of hardware. Examples of a VNF 320 include, but are not limited to, an SBC, an Internet Protocol (IP) Multimedia Subsystem (IMS) core, and a telephony application server. Other functions with pure IP connectivity may also be virtualized and embodied as VNFs. A VNF 320 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 320 has a corresponding Element Management System (EMS) 322. The EMS 322 includes a user interface, or a dashboard, that allows an administrator to configure the VNF 320 as desired. To provide full NFV, several VNFs work together to provide the desired services. In the present example, a plurality of VNFs 320-1, 320-2 . . . 320-n and corresponding EMSs 322-1, 322-2 . . . 322-n are used to provide NFV.

An EMS 322 may have access to a set of pre-defined rules. Such rules may be configured and/or defined by a human administrator. Such rules may be stored as a data structure in physical memory. One example of a rule used by an EMS 322 may define what statistics should be collected regarding operation of the VNF 320.

A VNF 320 typically includes several different components, which may or may not be identical, that together form the full VNF 320. For example, the different components may be different instances of the VNF application. The different instances then work together to provide the functionality of the full VNF 320. Multiple VNFs 320 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 320 provides such functions instead of a specialized piece of hardware.

A VNF 320 may be part of a telecommunications core network. The core network is the central part of a telecommunications networks. The core network provides various communication services to the subscribers such as voice communication. Subscribers are connected to the core network through an access network, which will be described in further detail below. In some examples, the VNF component can communicate with the core network over a first network and communicate with the access network over a second network. The first network is isolated from the second network such that communication between the VNF and the core network does not traverse the same physical network components as the communication between the VNF and the access network.

The VNFs 320 are managed by a VNF manager 326, which is part of the NFV management and orchestration module 340. In some cases, there may be multiple VNF managers 326, each managing one or more specific VNFs 320. The VNF manager 326 can manage the VNFs based on network demand. For example, at peak times, the VNF manager 326 can start up new instances of VNF components to scale dynamically according to demand. While there may be several VNF managers 326, there is typically a single orchestrator 328 that manages the VNF managers 326 and thus manages the entire NFV service. The VNF manager 326 may have access to a set of pre-defined rules. Such rules may be configured and/or defined by a human administrator or by the NFV Orchestrator (NFVO). Such rules may be stored as a data structure in physical memory. One example of a rule used by the VNF manager 326 may be when to instruct the virtual infrastructure manager 324 to provision an additional virtual machine. For example, when demand for services reaches a certain threshold of capacity, the VNF manager 326 can instruct the VIM to provision an additional virtual machine, virtual network, or virtual storage node so that an additional VNF component can be provisioned.

As will be described in further detail below, the VNFs 320 may have multiple components. Each VNF component may run on a different virtual machine. The VNF components within a VNF can be divided into different groups, each group assigned a different function. Thus, instead of a single type of VNF component that performs a variety of functions, the different groups of VNF components perform different functions. Additionally, different groups are managed differently. Thus, different groups can be scaled in different ways and use different redundancy mechanisms that best suit such groups.

Figure 4A:
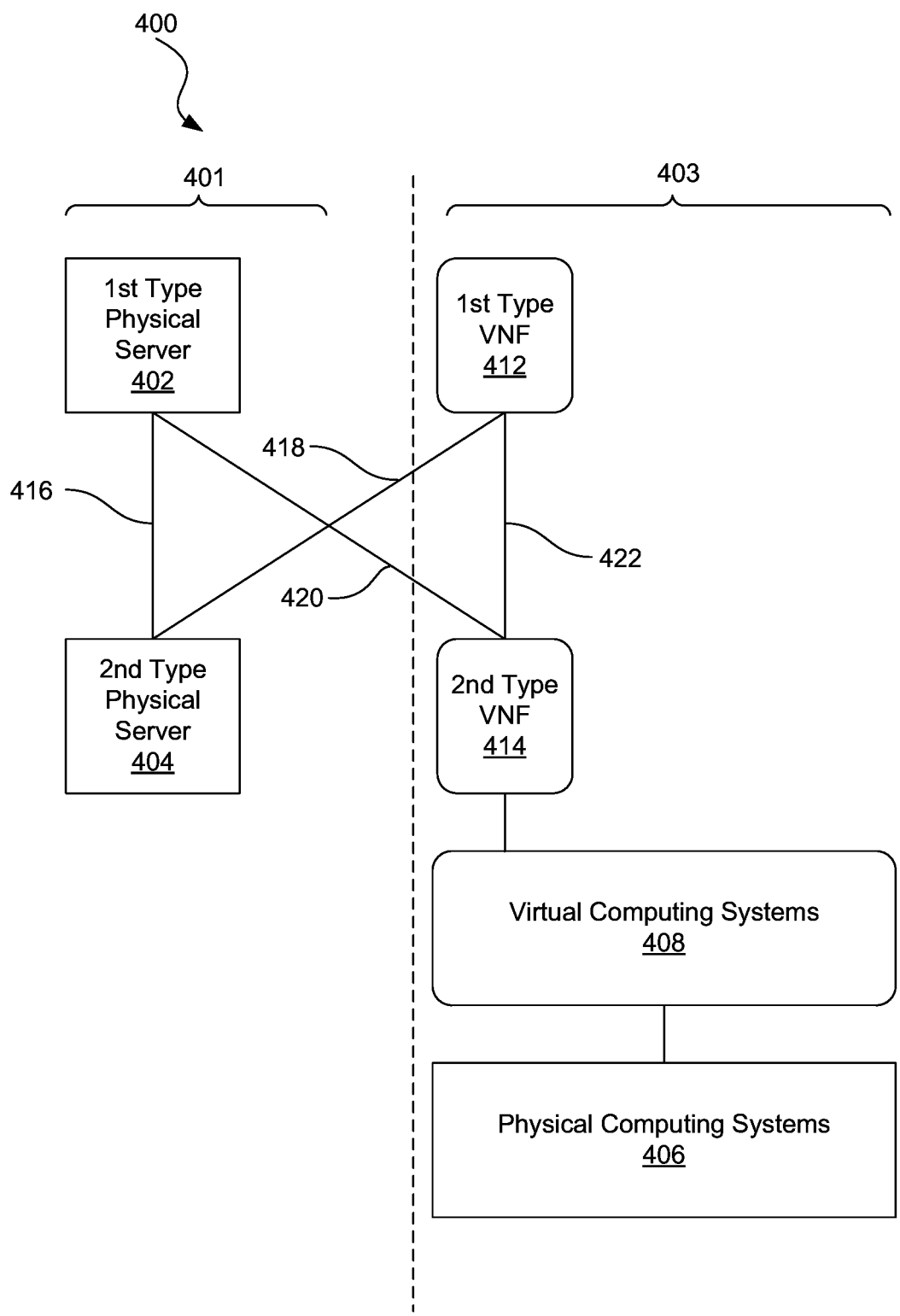
FIGS. 4A-4C are diagrams showing independent scaling of hybrid, distributed communication, according to one example of principles described herein.
Figure 4B:
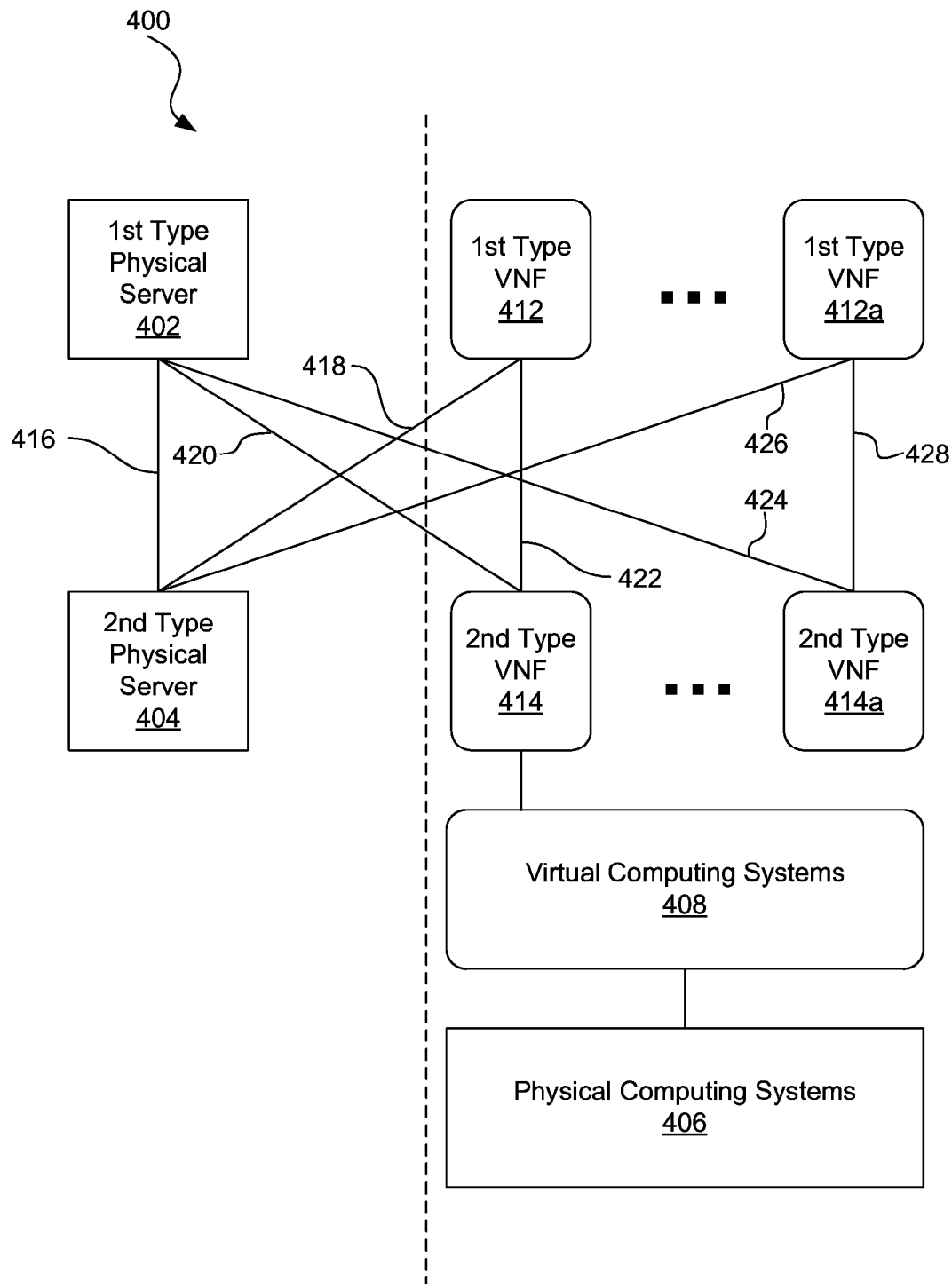
Figure 4C:
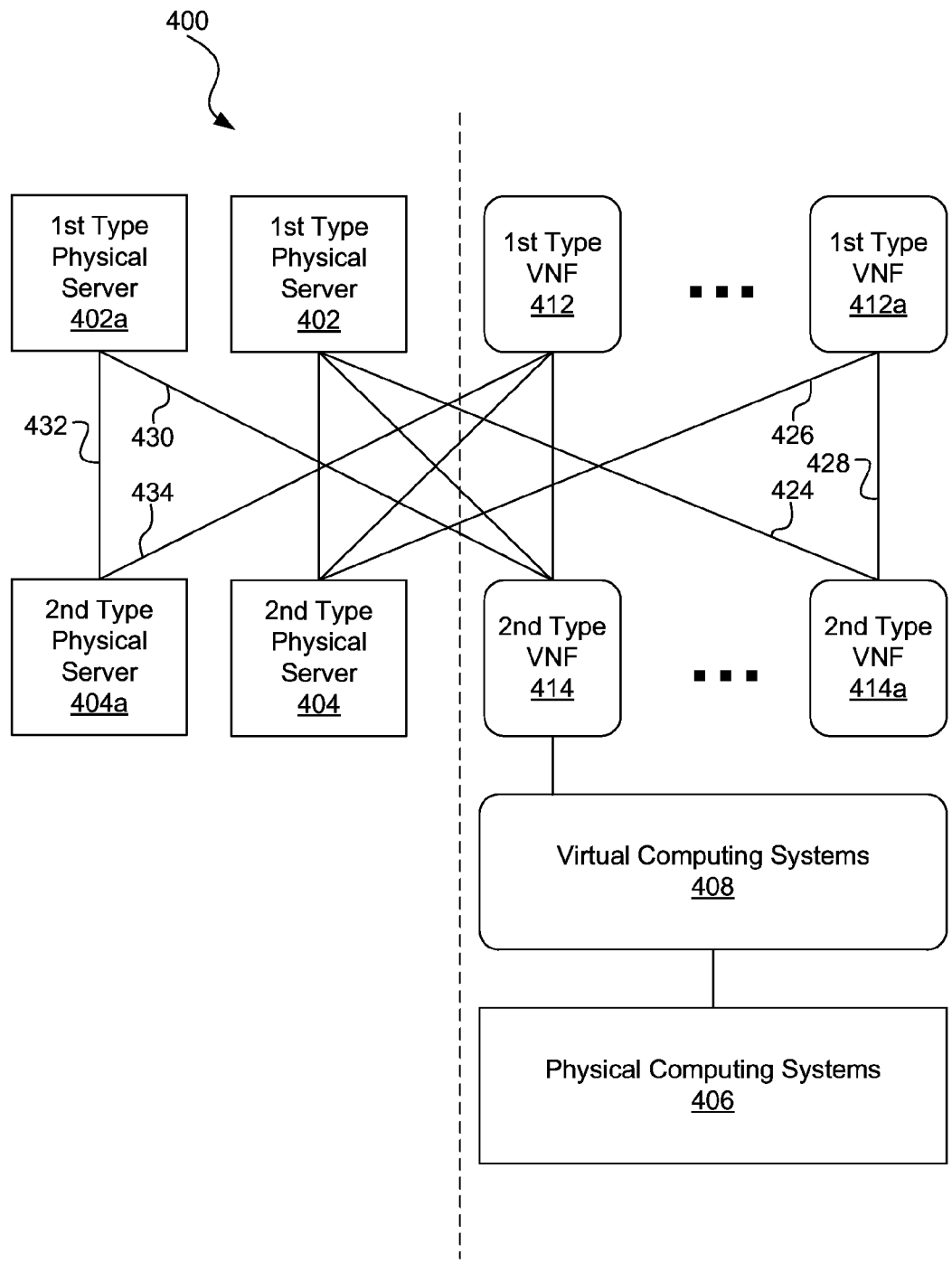

FIGS. 4A-4C are diagrams showing hybrid, distributed communication. According to the present example, a hybrid VNF 400 includes physical components 401 and virtual components 403. The physical components 401 may include physical servers that provide specific functions as dedicated pieces of hardware in a communications network. Thus, the physical components 401 may include processors and memory with machine readable instructions that when executed by the processors, cause the physical components 401 to perform their specified functions.

The virtual components 403 include VNFs that run on the plurality of virtual computing systems 408. The virtual computing systems may run on a plurality of physical computing systems 406. The physical computing systems 406 may form part of one or more data centers. The physical computing systems 406 may correspond to the physical resources (304, FIG. 1) described above. Additionally, the virtual computing systems 408 may correspond to the virtual resources (312, FIG. 1) described above.

In the present example, as illustrated in FIG. 4A, there is a first type physical server 402 and a second type physical server 404. The first type physical server 402 may perform one type of telecommunication function while the second type physical server 404 may perform a different type of telecommunication function. For example, the first type physical server 402 may perform a signaling function that utilizes Session Initiation Protocol (SIP). The second type physical server 404 may perform a media transfer function that utilizes Real-time Transport Protocol (RTP).

In the present example, there may be two different types of VNF components 412, 414. The first type VNF 412 may perform a function that is similar to that of the first type physical server 402. For example, the first type VNF 412 may perform the signaling function. Thus, the first type VNF 412 and first type physical server 402 may correspond to the first type nodes (108, FIG. 1). Additionally, the second type VNF 414 may perform a function that is similar to that of the second type physical server 404. For example the second type VNF 414 may perform the media transfer function. Thus, the second type VNF 414 and the second type physical server 404 may correspond to the second type nodes (110, FIG. 1).

In the present example, network connections are established between each of the physical components 401 and virtual components 403. Specifically a network connection 416 is established between the first type physical server 402 and the second type physical server 404. Additionally, a network connection 420 is established between the first type physical server 402 and the second type VNF 414. Thus, the first type physical server 402 is connected to both physical second type components and virtual second type components. Similarly, a network connection 418 is established between the first type VNF 412 and the second type physical server 404. Additionally, a network connection 422 is established between the first type VNF 412 and the second type VNF 414. Thus, the first type VNF 412 is connected to both physical second type components and virtual second type components.

In some examples, establishing a connection involves providing both endpoints with the physical and logical addresses of the other endpoint. For example, for connection 420, the first type physical server 402 may have the physical and logical address of the second type VNF 414. Conversely, the second type VNF 414 is provided with the physical and logical address of the first type physical server 402. Additionally, routing tables of routers within the network between the two endpoints may be updated accordingly. In some examples, the connections may involve a bi-directional open communication session between the two endpoints. For example, there may be an open communication session between the first type physical server 402 and the second type VNF component 414.

In some examples, as demand for telecommunication services changes, the number of VNF components may change as well. As described above, VNF components may be added and removed dynamically in response to changing demand. In the present example, an additional first type VNF 412*a* is created. Additionally, a new connection 426 is established between the second type physical server 404 and the additional first type VNF 412*a*. An additional second type VNF 414*a* is also created. Thus, an additional connection 424 is established between the first type physical server 402 and the additional second type VNF 414*a*. In some examples, an additional connection to 408 may also be established between the two additional VNFs 412*a*, 414*a*.

While only one additional first type VNF 412*a* and one additional second type VNF 414*a* are illustrated, multiple additional first type VNFs and second type VNFs may be created. Additionally, connections to those multiple additional VNFs and the other components of the hybrid, distributed VNF 400 may be established. The number of first type VNFs 412*a* may be scaled independently of the second type VNFs 414*a*. For example, there may be a change in demand for the function of the first type components but not an increase in demand for the second type components. Thus, only the number of first type VNFs may be adjusted. Alternatively, there may be a change in demand for the function of the second first type components but not an increase in demand for the second type components. Thus, only the number of second type VNFs may be adjusted.

In some examples, the hybrid, distributed VNF may include multiple first type physical servers and/or multiple second type physical servers. As shown in FIG. 4C, there is an additional first type physical server 402*a* and an additional second type physical server 404*a*. The additional first type physical server 402*a* may be connected to both physical second type components and virtual second type components. Specifically, connection 432 is established between first type physical server 402*a* and second type physical server 404*a*. Additionally connection 430 is established between the first type physical server 402*a* and the second type VNF 414. The additional second type physical server 404*a* may also be connected to one or more first type virtual components. For example, connection 434 is established between the second type physical server 404*a* and the first type VNF 412.

Connections between multiple physical types and multiple virtual types of components may be established under the direction of a VNF manager (e.g., 126, FIG. 1). In some examples, the VNF manager may manage both the virtual VNF components as well as the physical components that form the hybrid, distributed VNF. In some examples, the physical nature some of the components of the hybrid, distributed VNF may be transparent to the VNF manager. In other words, from the perspective of the VNF manager, the physical components 401 may present themselves as virtual components.

Figure 5:
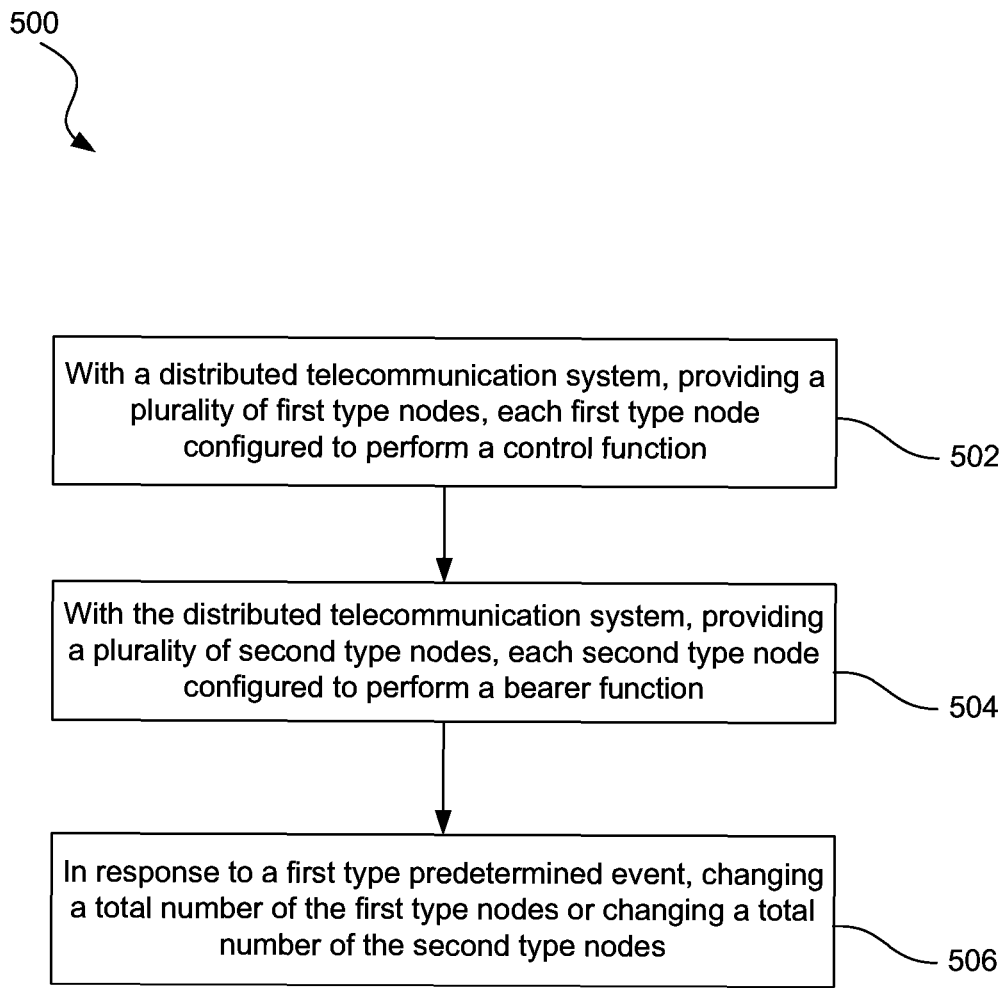
FIG. 5 is a flowchart showing an illustrative method for independent scaling of distributed telecommunication systems, according to one example of principles described herein.

FIG. 5 is a flowchart showing an illustrative method for independent scaling of distributed telecommunication systems. According to the present example, the method 500 includes a step 502 for, with a distributed telecommunication system, providing a plurality of first type nodes, each first type node configured to perform exclusively one of: a signaling function and a media bearing function. For example, the first type media nodes may perform the signaling function without performing the media bearing function. As described above, the signaling function involves establishing communication sessions between endpoints. For example, the signaling function may use SIP to establish a communication session between a first endpoint and a second endpoint at the request of the first endpoint.

According to the present example, the method 500 further includes a step 504 for, with the distributed telecommunication system, providing a plurality of second type nodes, each second type node configured to perform exclusively the other of the signaling function and media bearing function. For example, if the first type nodes are signaling nodes, then the second type nodes will be media nodes. As described above, the media nodes handle media data being transferred between the two endpoints. Media data may include data that represents various types of media such as audio streams, video streams, screen sharing, texts, images, and other forms of media.

According to the present example, the method 500 further includes a step 506 for, in response to a first type predetermined event, changing a total number of the first type nodes. Changing a total number of nodes may involve provisioning additional nodes or removing nodes that are currently being used. As described above, the predetermined event may be one of a different number of situations. For example, the predetermined event may be a change in demand for the services provided by the first node. If the first type nodes are media nodes, and demand for media services increases above a threshold level, then additional media nodes may be provisioned. Conversely, if demand for media nodes falls below a predetermined threshold level, then a media node may be decommissioned.

Similarly, if the first type nodes are signaling nodes, and demand for signaling services increases above a threshold level, then additional signaling nodes may be provisioned. Conversely, if demand for signaling nodes falls below a predetermined threshold level, then a signaling node may be decommissioned. Various predetermined events may cause changes in demand. For example, if different applications seek use of the media nodes, this may change demand. Additionally, if different codecs are used, this may change demand.

Figure 6A:
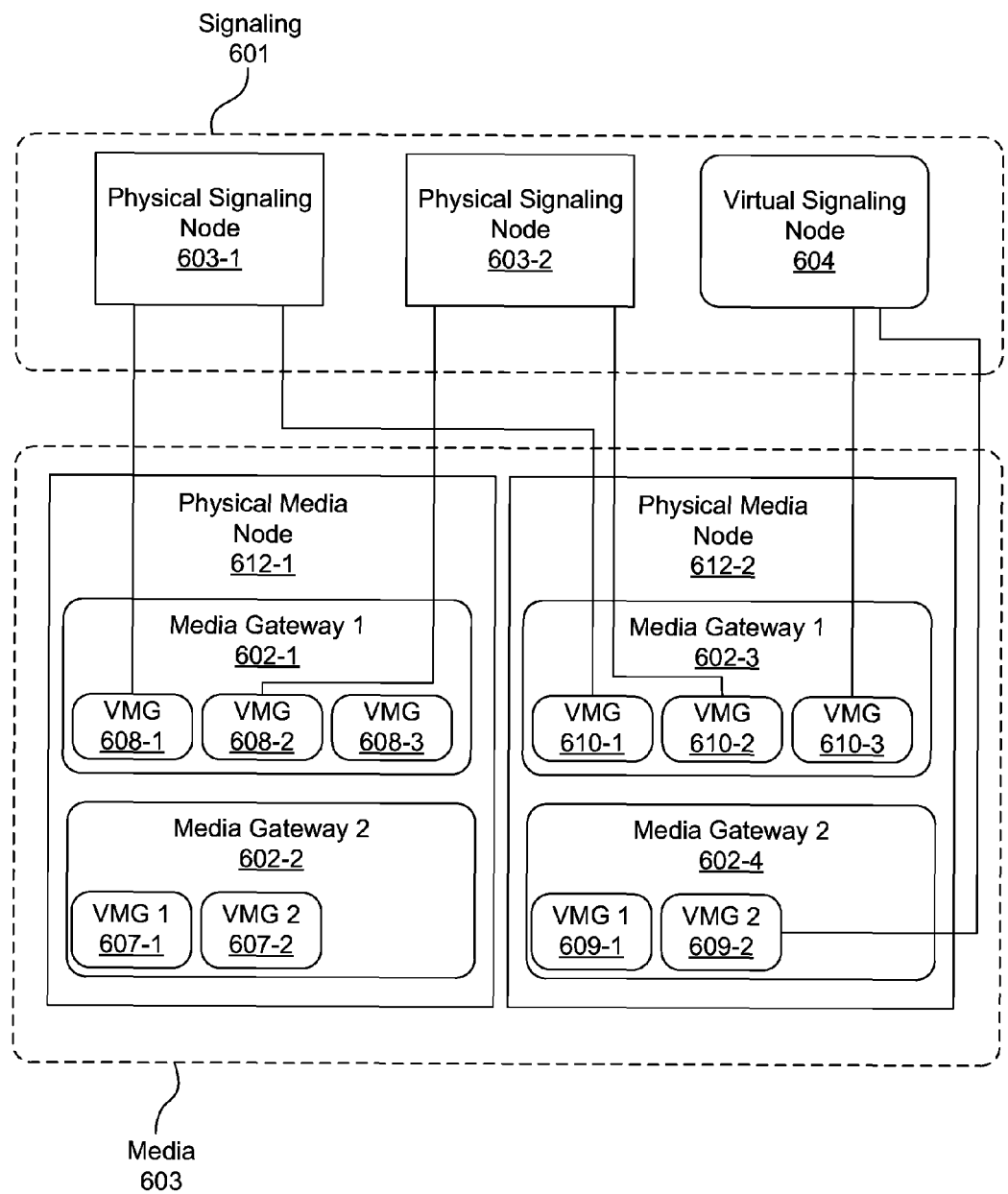
FIGS. 6A and 6B are diagrams showing illustrative sharing of resources within a distributed telecommunication system, according to one example of principles described herein.
Figure 6B:
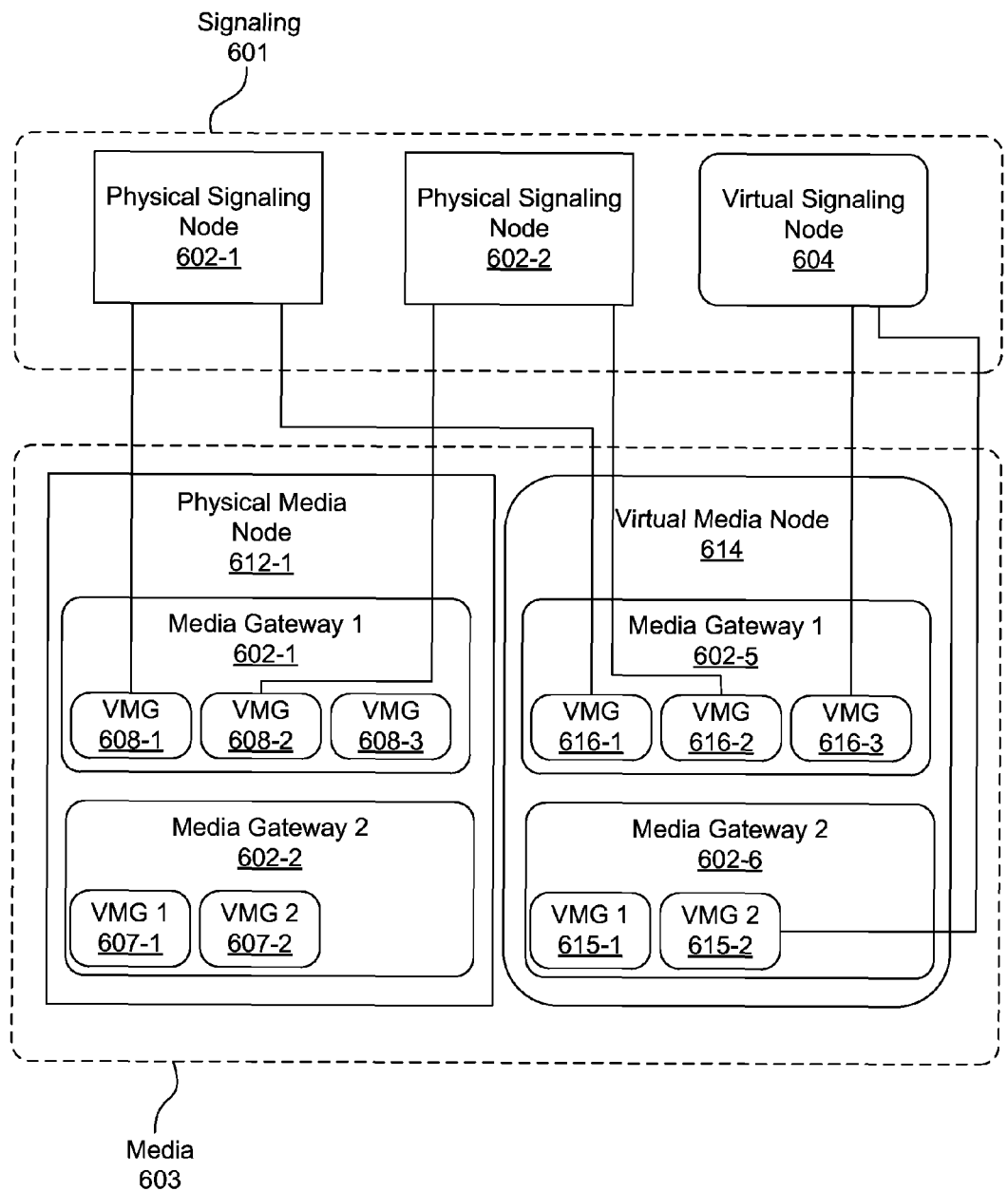

FIGS. 6A and 6B are diagrams showing illustrative sharing of resources within a distributed telecommunication system. With multiple signaling nodes and multiple media nodes existing in a distributed telecommunication signaling systems, the media nodes may share resources in a manner that allows for versatile and efficient use of resources. FIG. 6A illustrates signaling resources 601 that include a plurality of signaling nodes 602-1, 602-2, 604 and media resources 603 that include a plurality of media nodes 612-1, 612-2. In the present example, a first physical media node 610-1 includes two media gateways 602-1, 602-2. The first media gateway 602-1 includes three virtual media gateways 608-1, 608-2, 608-3 and the second media gateway 602-2 includes two virtual media gateways 609-1, 609-2.

The physical media nodes 612-1, 612-2 may be physical pieces of hardware that are dedicated to processing media traffic between two different endpoints. The physical pieces of hardware are thus physically connected to a network that connects such endpoints.

A media gateway 602-1, 602-2 converts media streams from one telecommunication technology to another. For example, a media gateway may convert media stream from Time Division Multiplexing (TDM) technology to 4G technology. A media gateway may also process media streams across different packet networks that use different transport protocols. For example, a media gateway may process media that is being transported between a network that uses Internet Protocol (IP) and a network that uses Asynchronous Transfer Mode (ATM). A particularly media gateway may have the capability to process media streams for a specified number of calls. For example, a media gateway may be able to process calls for up to 40,000 subscribers at a time.

In the present example, physical media node 102-1 includes two media gateways. Each media gateway may have the ability to handle its own separate capacity. In some examples, each media gateway 602-1, 602-2 has similar capacity. For example, both media gateways 602-1, 602-1 may each have the capacity to handle 50,000 calls at a given time. In some examples, the media gateways 602-1, 602-2 may have different capacities. For example, the first media gateway 602-1 may have a capacity of 30,000 and the second media gateway 602-2 may have a capacity of 20,000.

A media gateway 602-1, 602-2 may have virtual components that will be referred to as virtual media gateways. The virtual media gateways are a logical construct that are presented to outside entities. For example, a first virtual media gateway 608-1 may present itself to physical signaling node 603-1 and a second virtual media gateway 608-2 may present itself to physical signaling node 603-2. In general, there may be one virtual media gateway for each signaling node serviced by the physical media node 612-1. The number of virtual media gateways within a media gateway 606-1, 606-2 may also scale based on change in demand. For example, if an additional signaling node is provisioned, and there are currently no available virtual media gateways in any of the media nodes 612-1, 612-2, then one of the media gateways in one of the physical media nodes 612-1, 612-2 may provision an additional virtual media gateway for use by that new signaling node. Additionally, if all of the virtual media gateways are currently at maximum capacity, or within a predefined percentage of maximum capacity, then one of the media gateways may provision an additional virtual media gateway for use by the signaling nodes.

The virtual media gateways within a particular media gateway may provide access to the resources of the media gateway and various matters. In one example, each virtual media gateway provides access to only a subset of the media gateway's capacity. For example, if the first media gateway 606-1 has a capacity for 40,000 calls, and the first virtual media gateway 608-1 may provide access to only 10,000 calls, the second virtual media gateway 608-2 may provide access to only 10,000 calls, and the third virtual media gateway 608-3 may provide access to only 20,000 calls. In other words, the media gateway cannot oversubscribe.

In some examples, each of the virtual media gateways may provide access to the full capacity of the media gateway. For example, if the first media gateway 606-1 has a capacity of 40,000 calls, and each virtual media gateway 608-1, 608-2, 608-3 within that first media gateway 606-1 may inform its respective signaling node that it has a capacity of 40,000. Specifically, the first virtual media gateway 608-1 may inform physical signaling node 603-1 that it has access to 40,000 calls of the physical media node 612-1. Similarly, the second virtual media gateway 608-2 may inform physical signaling node 603-2 that it has access to 40,000 calls from physical media node 612-1. If physical signaling node 603-1 is currently using 40,000 calls from physical media node 612-1, and physical signaling node 603-2 requests use of resources of the media gateway 606-1, it will be informed that the request cannot be completed. For example, physical signaling node 603-2 may be directed to seek resources from a different media gateway from a different physical media node 612-2.

A particular signaling node may access resources for more than one media node. For example, physical signaling node 603-1 accesses media resources from virtual media gateway 608-1 from physical media node 612-1 and virtual media gateway 610-1 from physical media node 612-2. Similarly, physical signaling node 603-2 accesses media resources from virtual media gateway 608-2 from physical media node 612-1 and virtual media gateway 610-2 from physical media node 612-2. Additionally, the number of media nodes that may be utilized by particular signaling node may change in real time based on a variety of factors including network conditions in demand for services.

In some examples, a particular signaling node may utilize resources from both media gateways of a particular media node. For example, the virtual signaling node 604 may access resources from virtual media gateway 610-3 from the first media gateway 606-3 as well as virtual media gateway 609-2 from the second media gateway 602-4. Other signaling nodes may access resources from multiple media gateways in a similar manner.

The signaling resources 601 may include both physical signaling nodes and virtual signaling nodes. By the present example illustrates two physical signaling nodes 602-1, 602-2 and one virtual signaling node, other combinations are possible. For example, it may be the case that all of the signaling nodes within a particular distributed communication system or physical nodes. In some examples, it may be the case that all nodes in the distributed telecommunication system are virtual signaling nodes. Similarly, the media resources 603 may include a variety of physical media nodes and virtual media nodes.

FIG. 6B illustrates an example in which one of the media nodes is a virtual media node 614. Similar to the physical media nodes, the virtual media node 614 includes two media gateways 602-5, 602-6. The first media gateway 602-5 includes three virtual media gateways 616-1, 616-2, 616-3. Additionally, the second media gateway 602-6 includes two virtual media gateways 615-1, 615-2. In one example, the virtual media node 614 is a VNF component of a network function virtualization infrastructure. Thus, additional virtual media nodes may be provisioned on demand.

Figure 7:
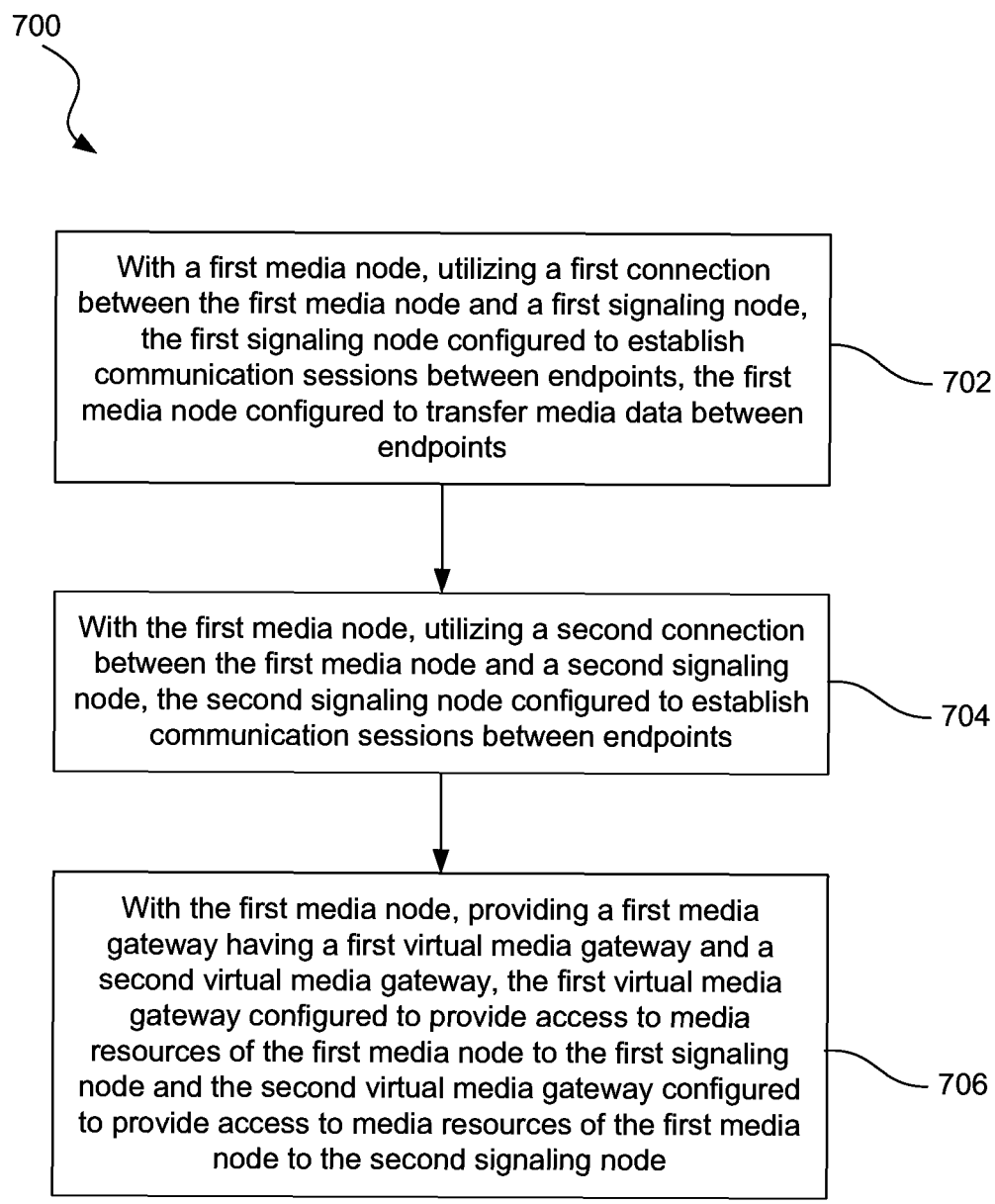
FIG. 7 is a flowchart showing an illustrative method for sharing resources within a distributed telecommunication system, according to one example of principles described herein.

FIG. 7 is a flowchart showing an illustrative method 700 for sharing resources within a distributed telecommunication. According to the present example, the method 700 includes a step 702 for, with the first media node, utilizing a first connection between the first media node and a first signaling node. Utilizing the first connection may include transferring data over a network that connects the first media node and first signaling node. The first signaling node is configured to establish communication sessions between endpoints. This may be done, for example, through using SIP. The first media node is configured to transfer media data between endpoints. This may be done, for example, through use of RTP. The media data may represent audio streams, video streams, images, text, and other forms of media.

According to the present example, the method 700 further includes a step 704 for, with the first media node, utilizing a second connection between the first media node and a second signaling node. Utilizing the second connection may include transferring data between the first media node and the second signaling node. Like the first signaling node, the second signaling node is configured to establish communication sessions between endpoints.

According to the present example, the method 700 further includes a step 706 for, with the first media node, providing a first media gateway having a first virtual media gateway and a second virtual media gateway. The first virtual media gateway configured to provide access to media resources of the first media node to the first signaling node and the second virtual media gateway configured to provide access to media resources of the first media node to the second signaling node.

Figure 8:
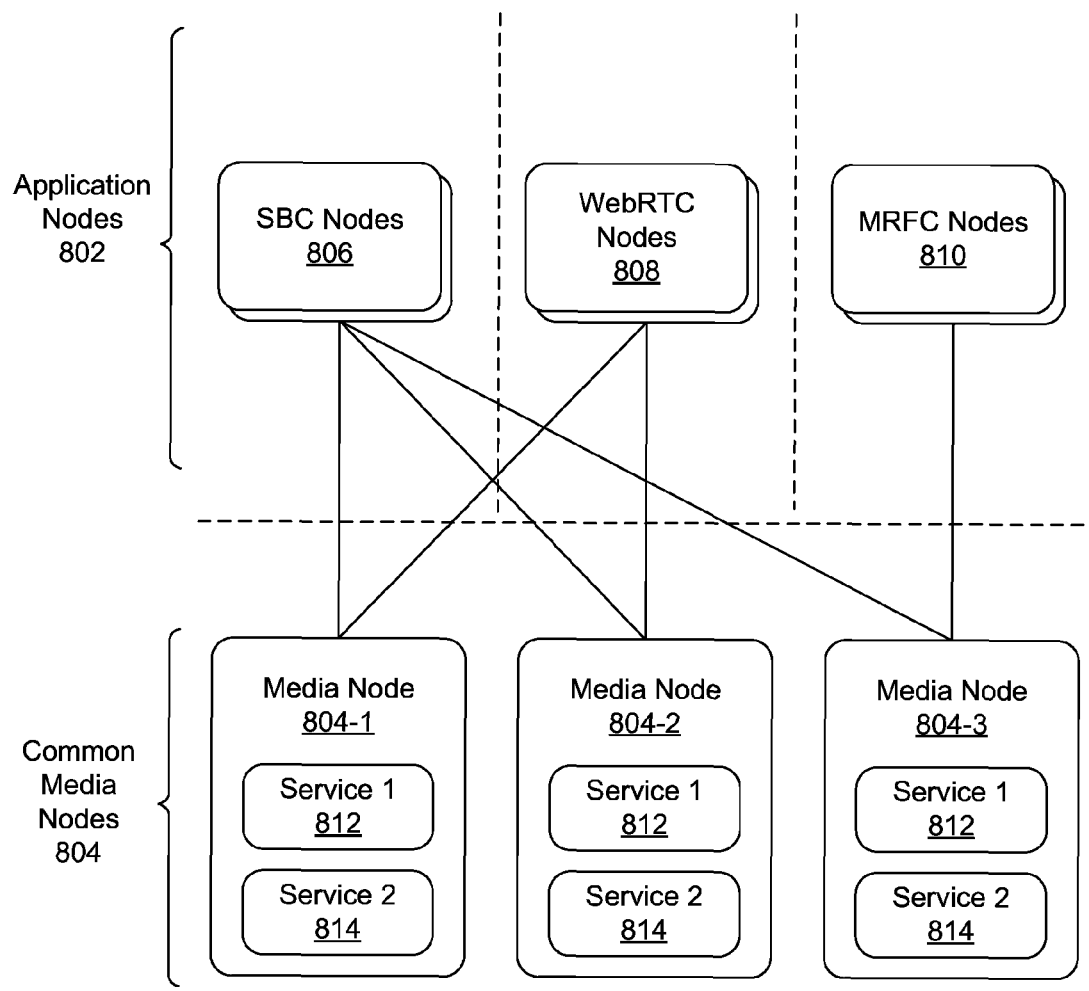
FIG. 8 is a diagram showing use of a common media platform, according to one example of principles described herein.

FIG. 8 is a diagram showing use of a common media platform. According to the present example, different types of communication applications and different types of telecommunication components may utilize the same media nodes. For example, as described above, a distributed SBC may include a signaling node and a media node. The signaling node utilizes resources of the media node. According to principles described herein, other applications may utilize that media node as well. For example, a Web Real Time Communication (WebRTC) service may have a distributed architecture as well. Thus, the WebRTC may include a signaling node and a media node. Both the SBC and the WebRTC server may thus use the same media nodes that provide a common media platform.

FIG. 8 illustrates a set of application nodes 802 that utilize a distributed architecture. FIG. 8 also illustrates common media nodes 804 that are shared by the application nodes 802. The application nodes 802 include SBC nodes 806, WebRTC nodes 808, and MRF nodes.

As described above, an SBC may handle communication traffic across different networks. For example, an SBC may handle communication traffic being passed between a private network and a public network such as the Internet. In the case of the distributed SBC as described herein, the media node may provide a number of services to the SBC nodes 806. For example, the media nodes 804 may provide a first service 812 such as a transcoding service and a second service 814 such as a network translation service.

Media data, such as audio data or video data, is encoded for transmission over a network. As described above, a codec is the mechanism by which data is encoded and decoded. There are a variety of ways in which media data may be encoded. Different networks and different applications may utilize different encoding techniques and different codecs. Thus, when media data is being passed from one network to another, the media data may have to be encoded differently. The process by which media data is transferred from one type of encoding to another is referred to as transcoding. The media nodes 804 may thus provide this transcoding service.

Transmitting data over a network involves the use of various protocols. Different networks may utilize different protocols. One example of a transfer protocol is Transmission Control Protocol (TCP). The network translation service 814 may include changing data from one protocol to another. Another function of the network translation service 814 may include Network Address Translation (NAT). Network address translation involves remapping one IP address space into another. This involves changing the network address in an IP data packet header as the packet is passing through the media node 804. For example, this may involve switching from an IPv4 space to an IPv6 space. Other administrative tasks related to passing data from one network to another may be included in the network translation service 814.

The WebRTC nodes 808 provide WebRTC functionality to endpoints over a network. WebRTC defines various communication protocols and Application Programming Interfaces (APIs) to enable real-time communication between web browsers. Thus, a WebRTC server (e.g., one of the WebRTC nodes 808) may allow real-time communication between a first browser on a first endpoint device and a second browser on a second endpoint device. The WebRTC nodes 808 may also have a distributed architecture. Thus, the media bearing functionality of a WebRTC server may be handled by the common media nodes while the functionality that is specific to a WebRTC server is performed by the WebRTC nodes.

A Media Resource Function (MRF) node provides various media related functions. Such functions may include media manipulation (e.g., voice stream mixing), playing of tones, and playing of announcements. In the present example, the MRF is distributed into a signaling node (e.g., Media Resource Function Controller (MRFC)) and a media processing node (e.g., Media Resource Function Processor (MRFP)). The MRF nodes 810 may thus be MRFCs and the common media nodes 804 may act as MRFPs.

Each application node 802 may utilize media services from one or more of the common media nodes 804. In the present example, the SBC nodes 806 utilize media services from media node 804-1, media node 804-2, and media node 804-3. The WebRTC nodes 808 utilize media services from media node 804-1 and media node 804-2. The MRF nodes utilize media services from media node 804-3. However, any of the application nodes may utilize media services from any one of the common media nodes 804.

Additionally, any of the common media nodes 804 may provide media services to any one of the application nodes 802. In the present example, media node 804-1 provides media services to an SBC node 806 and a WebRTC node 808. Similarly, media node 804-2 provides media services to an SBC node 806 and a WebRTC node 808. Media node 804-3 provides media services to an SBC node 806 and an MRF node 810. However, any one of the common media nodes 804 may provide service to any one of application nodes 802.

The number of common media nodes that are utilized by a particular application node 804 may depend on various conditions. Such conditions may include network usage and workload of a particular media node. For example, an SBC node may be utilizing media services from media node 804-1. If the SBC node 806 needs additional services and the media node 804-1 is at full capacity, then the additional services may be provided by another media node (either 804-2 or 804-3). In some cases, if demand for services is currently low, and that demand can be satisfied by a single media node 804, then an application node may only utilize a single common media node 804.

The common media nodes 804 may utilize various mechanisms to provide services to multiple different types of application nodes 802. In one example, the common media nodes may utilize virtual media gateways as described in the text above that accompanies FIGS. 6A-6B. Specifically, the common media nodes 804 may each have a media gateway that includes a plurality of virtual media gateways. In one example, the number of virtual media gateways for a particular common media node 804 may be based on the number of application nodes 802 being serviced by that common media node 804.

In some examples, each of the common media nodes 804 may be physical devices. In some examples, each of the common media nodes 804 may be virtual nodes that are embodied as VNFs in an NFV infrastructure. In some examples, at least one of the common media nodes may be a physical node and at least one of the common media nodes may be a virtual node. Similarly, in some example, each of the application nodes 802 may be physical devices. In some examples, each of the application nodes 802 may be embodied as VNFs in an NFV infrastructure. In some examples, at least one of the application nodes 802 may be a physical device and at least one of the application nodes may be virtualized. Such hybrid architecture is described above in the text accompanying FIGS. 4A-4C.

Figure 9:
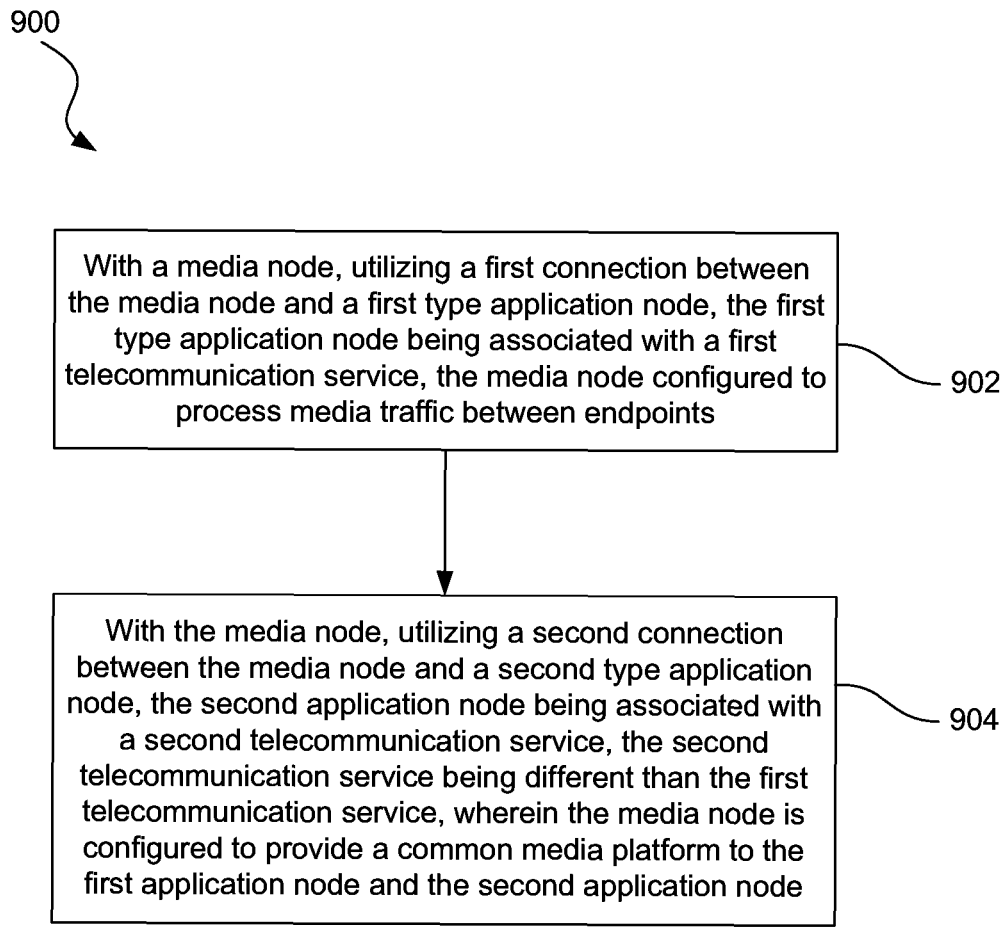
FIG. 9 is a diagram showing a method for using a common media platform, according to one example of principles described herein.

FIG. 9 is a diagram showing a method 900 for using a common media platform. According to one example, the method 900 includes a step 902 for, with a media node, utilizing a first connection between the media node and a first type application node. The application node may be, for example, an SBC node, a WebRTC node, or an MRF node. The first type application node is associated with a first telecommunication service. Such a telecommunication service may include, for example, a VoIP service, a WebRTC-based communication service, or other communication service. The media node is configured to process media traffic between endpoints. The media node may provide various media processing services such as transcoding, network translation, and other media processing services.

The method 900 further includes a step 904 for, with the media node, utilizing a second connection between the media node and a second type application node, the second application node being associated with a second telecommunication service, the second telecommunication service being different than the first telecommunication service. The media node is configured to provide a common media platform to the first application node and the second application node. Thus, various application nodes associated with different telecommunication services may utilize the same media nodes. This allows for efficient utilization of resources.

Figure 10A:
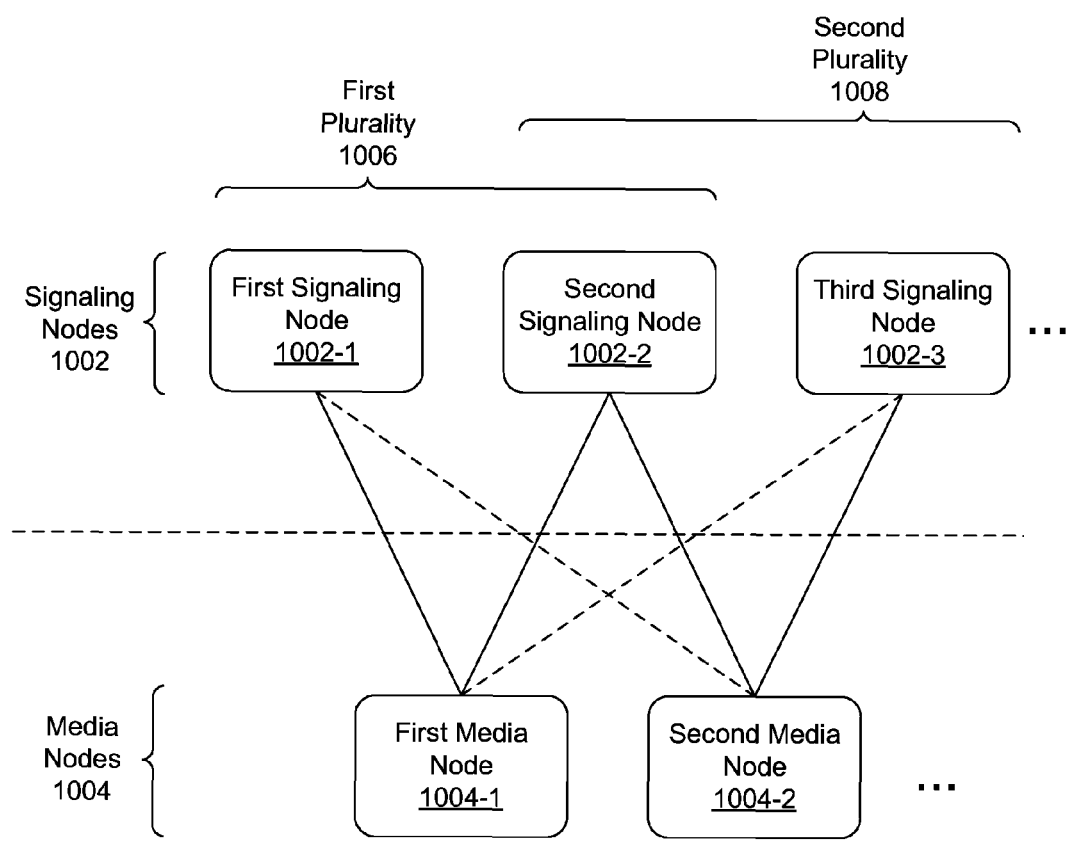
FIGS. 10A and 10B are diagrams showing illustrative MxN architecture, according to one example of principles described herein.
Figure 10B:
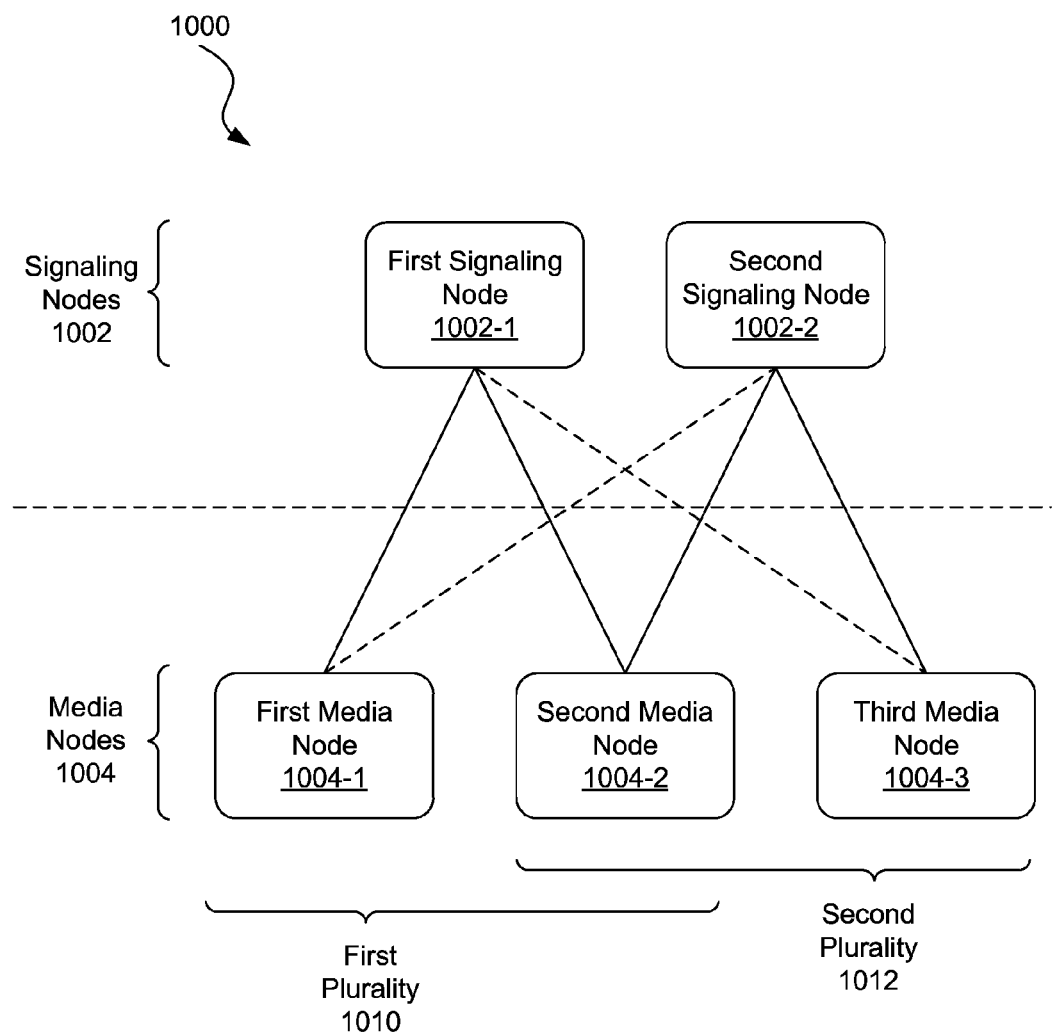

FIGS. 10A and 10B are diagrams showing illustrative MxN architecture. According to the present example, a distributed telecommunication component 1000 includes a set of signaling nodes 1002 and a set of media nodes 1004. While signaling and media nodes are shown as examples, it is understood that the principles may appy to other types of control and bearer nodes. The signaling nodes 1002 and the media nodes 1004 are connected to each other in a manner that allows for efficient use of resources. The telecommunication component may be one of a variety of telecommunication components described above. For example, the telecommunication component 1000 may be a distributed SBC, a distributed WebRTC server, or a distributed MRF server.

In the present example as illustrated in FIG. 10A, the first media node 1004-1 is configured to provide media services to a first plurality of signaling nodes 1006. The first plurality of signaling nodes 1006 includes the first signaling node 1002-1 and the second signaling node 1002-2. Similarly, the second media node 1004-2 is configured to provide media services to a second plurality of signaling nodes 1008. The second plurality of signaling nodes 1008 includes the second signaling node 1002-2 and the third signaling node 1002-3. Thus, the first plurality of signaling nodes 1006 and the second plurality of signaling nodes 1008 have a common signaling node (the second signaling node 1002-2). Additionally, both the first plurality signaling nodes 1006 and the second plurality signaling nodes 1008 include signaling nodes that are not common between the pluralities 1006, 1008. Specifically, the first plurality of signaling nodes 1006 includes the first signaling node 1002-1, which is not in the second plurality signaling nodes 1008. Similarly, the second plurality of signaling nodes 1008 includes the third signaling node 1002-3, which is not included in the first plurality of signaling nodes 1006.

The media nodes 1004 may be configured to provide media services to multiple signaling nodes 1002 and a variety of manners. In one example, a media node 1004 may include a media gateway having a plurality of virtual media gateways as described above in the text accompanying FIGS. 6A and 6B. For example, the first media node 1004-1 may include a first virtual media gateway configured to provide media services to the first signaling node 1002-1 and a second virtual media gateway configured to provide media services to the second signaling node 1002-2.

In some examples, the media nodes 1004 are physical devices placed within a network. In some examples, the media nodes 1004 are embodied is VNFs in an NFV infrastructure. In some examples, the media nodes 1004 include both physical devices and VNFs as described above in the text accompanying FIGS. 4A-4C. Similarly, the signaling nodes 1002 may include physical devices, VNFs, or both.

In some examples, the first media node 1004-1 may provide media services to other nodes as indicated by the dashed line. Similarly, the second media node 1004-2 may provide media services to other nodes as indicated by the dashed line.

In the present example as illustrated in FIG. 10B, the first signaling node 1002-1 is configured to receive media services from a first plurality of media nodes 1010. The first plurality of media nodes 1010 includes both the first media node 1004- and the second media node 1004-2. Similarly, the second signaling node 1002-2 is configured to receive media services from a second plurality of media nodes 1012. The second plurality of media nodes 1012 includes both the second media node 1004-2 and the third media node 1004-3. Thus, the first plurality of media nodes 1010 and the second plurality of media nodes have a common media node (the second media node 1004-2). Additionally both the first plurality of media nodes 1010 and the second plurality of media nodes 1012 include media notes that are not common between the pluralities 1010, 1012. Specifically, the first plurality of media nodes 1010 includes the first media node 1004-1, which is not in the second plurality media nodes 1012. Similarly, the second plurality of media nodes 1012 includes the third media node 1004-3, which is not included in the first plurality of media nodes 1010.

In some examples, the first signaling node 1002-1 may be configured to receive media services from other nodes as indicated by the dashed line. Similarly, the second signaling node 1002-2 may be configured to receive media services from other nodes as indicated by the dashed line.

The connections illustrated in FIGS. 10A and 10B may change dynamically in real time. For example, a particular signaling node may utilize the media nodes 1004 based on a variety of resource selection functions. A resource selection function defines how a particular signaling node will use the media resources of available media nodes and how such usage will change in response to specific events. In one example, a signaling node 1002 may utilize a round-robin approach where it utilizes a fraction of the capacity of the media nodes in a round-robin manner until it reaches demand for services is fulfilled. In some cases, the system may operate on a first-come-first-serve basis. In other words, a particular signaling node 1002 will use the services of one particular media node until that media node reaches full capacity. In response to such event, the particular signaling node will then began to utilize a second media node until that second media node reaches full capacity. Other resource selection functions may be used as well In some cases, the resource selection functions may be more specific and rely on specific sets of criteria. For example, if one of the endpoints associated with a call originates from a particular geographic location (e.g., overseas), then the signaling node may choose to use a specific media node that is physically positioned closest to that geographic location, or a media node that is set up to better handle international calls. In the case that the media nodes are virtual media nodes, then the virtual media node being supported by the physical infrastructure that is most closely positioned to an endpoint may be selected.

Figure 11:
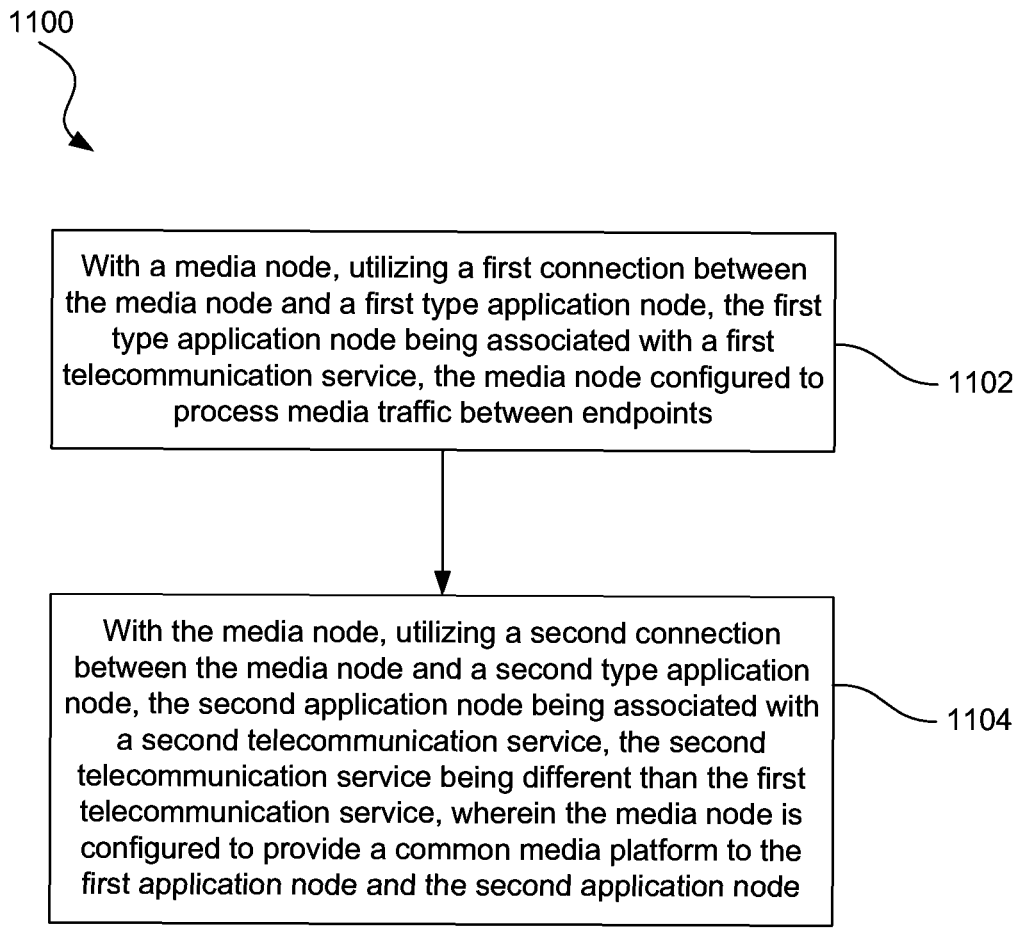
FIG. 11 is a flowchart showing an illustrative method for utilizing MxN architecture according to one example of principles described herein.

FIG. 11 is a flowchart showing an illustrative method 1100 for utilizing MxN architecture. According to the present example, the method 1100 includes a step 1102 for, with a first media node of a telecommunication component, utilizing network connections between the first media node and a first plurality of signaling nodes of the telecommunication component. The media node is configured to process media data being transmitted between endpoints over a network.

The method 1100 further includes a step 1104 for, with a second media node of the telecommunication component, utilizing network connections between the second media node and a second plurality of signaling nodes of the telecommunication component. The second plurality of signaling nodes having at least one signaling node in common with the first plurality of signaling nodes and at least one signaling node not common with the first plurality of signaling nodes.

Figure 12A:
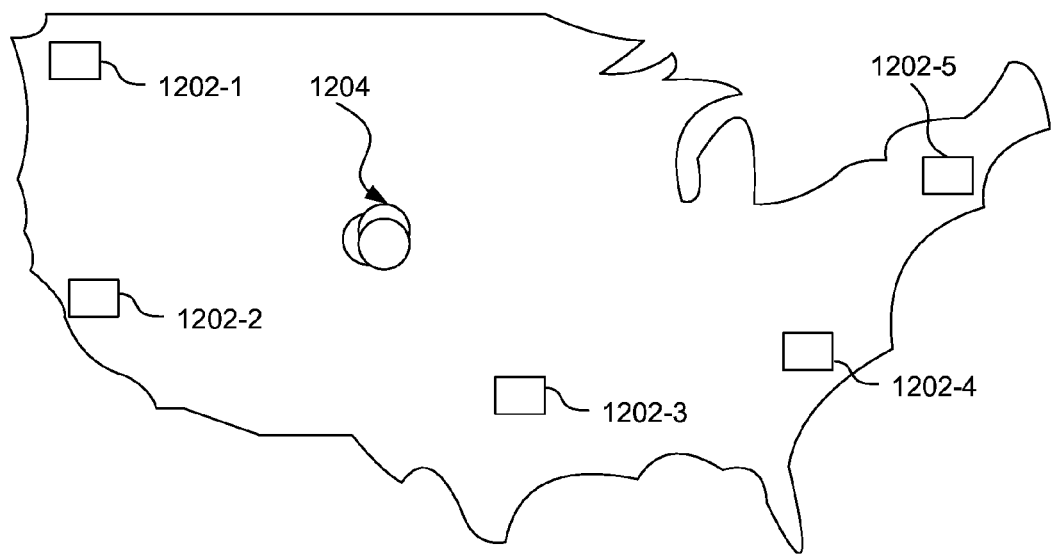
FIGS. 12A and 12B are diagrams showing geographic locations of distributed telecommunication component nodes, according to one example of principles described herein.
Figure 12B:
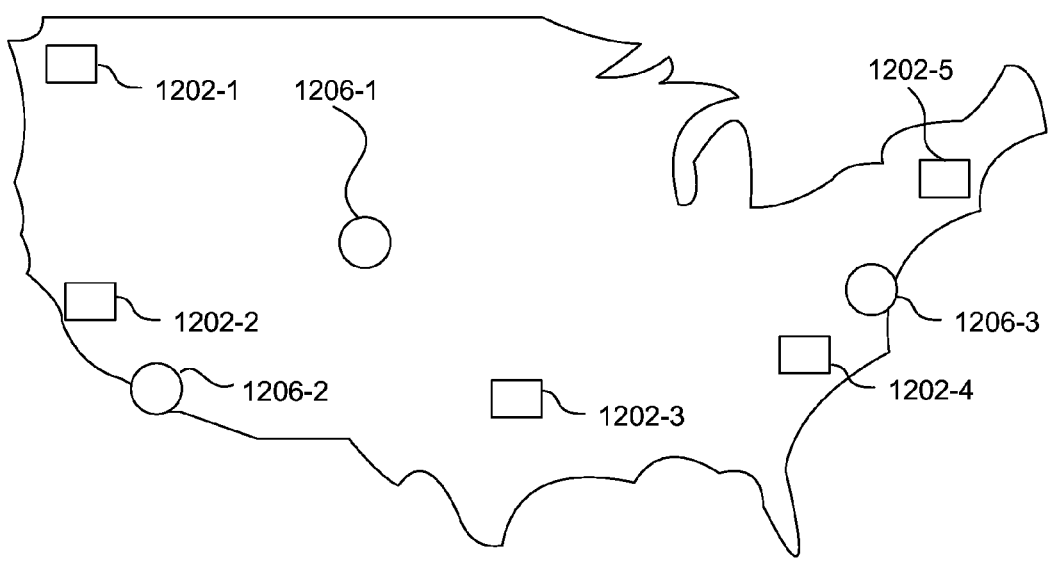

FIGS. 12A and 12B are diagrams showing geographic locations of distributed telecommunication component nodes. As described above, a set of a telecommunication component, such as an SBC, can be distributed by function. Specifically, the signaling function can be separated from the media function. Thus, there may be a set of first type nodes to perform the signaling function and a set of second type nodes that perform the media function. In some examples, the signaling nodes may be geographically separated from each other. In some examples, the signaling nodes may be geographically separated from the media nodes.

FIG. 12A illustrates an example in which the first type nodes 1202-1, 1202-2, 1202-3, 1202-4, 1202-5 are geographically separated by larger distances, while the second type nodes 1204 our centralized. In some examples, each of the second type nodes 1204 may reside within the same data center in a particular geographic location. In some examples, each of the second type nodes 1204 may reside in different data centers within the same city. Stated differently, each of the second type nodes 1204 may be within a 50 mile radius of each other. In some examples, it may be desirable to have the media nodes centrally located while the signaling nodes are spaced closer to various endpoints.

The second type nodes 1204 are centrally located relative to the first type nodes because they are positioned between first type nodes. Particularly, the second type nodes 1204 are geographically positioned between at least two first type nodes. For example, the second type nodes 1204 are positioned between first type nodes 1202-1 and first type node 1202-3. From another perspective, the second type nodes 1204 are positioned between first type node 1202-2 and first type nodes 1202-4, and 1202-5.

According to the present example, a set of first type nodes 1202-1, 1202-2, 1202-3, 1202-4, 1202-5 are each positioned at geographic locations. Thus, they are geographically separated from each other. In some cases, two first type nodes may be geographically separate by being in a different datacenter within the same city. In some examples, to first type nodes may be geographically separate by being in different data centers in different cities. In some examples, two different nodes that are geographically separated maybe distance from each other by at least 100 miles. In some cases, two different nodes that are geographic separated may be separated by distance of at least 1000 miles.

As described above, some of the first type nodes or second type nodes may be virtual nodes. The location of a virtual node corresponds to the physical location of the hardware use to support that virtual node. For example, if a particular virtual node is currently residing on a physical server in a datacenter, then the location of that virtual node will be considered as the location of that physical server. If the virtual node is moved to a different physical server, then the location of that virtual node will be updated to the geographic location of the different physical server.

Various protocols may be used to transfer data across the larger geographic distances between first type nodes 1202 and second type nodes 1204. In one example, H.248 protocol may be used. Other layer 3 protocols may be used as well. Such protocols may be designed to reduce the flight time of data being transferred between endpoints. In order to provide a quality experience for end users, it is desired that total delay be reduced below a predetermined threshold.

FIG. 12B illustrates an example in which the second type nodes are geographically separated from each other as well. In some cases, it may be desirable to have media nodes position more closely to various endpoints. Additionally, having media nodes enhances the high-availability telecommunication service and provides additional fault tolerance. For example, if a geographically specific natural disaster takes one of the second type nodes 1204 out of commission, then a second type node 1204 from a different location may take other responsibilities from the second type node total for that is out of service.

Figure 13:
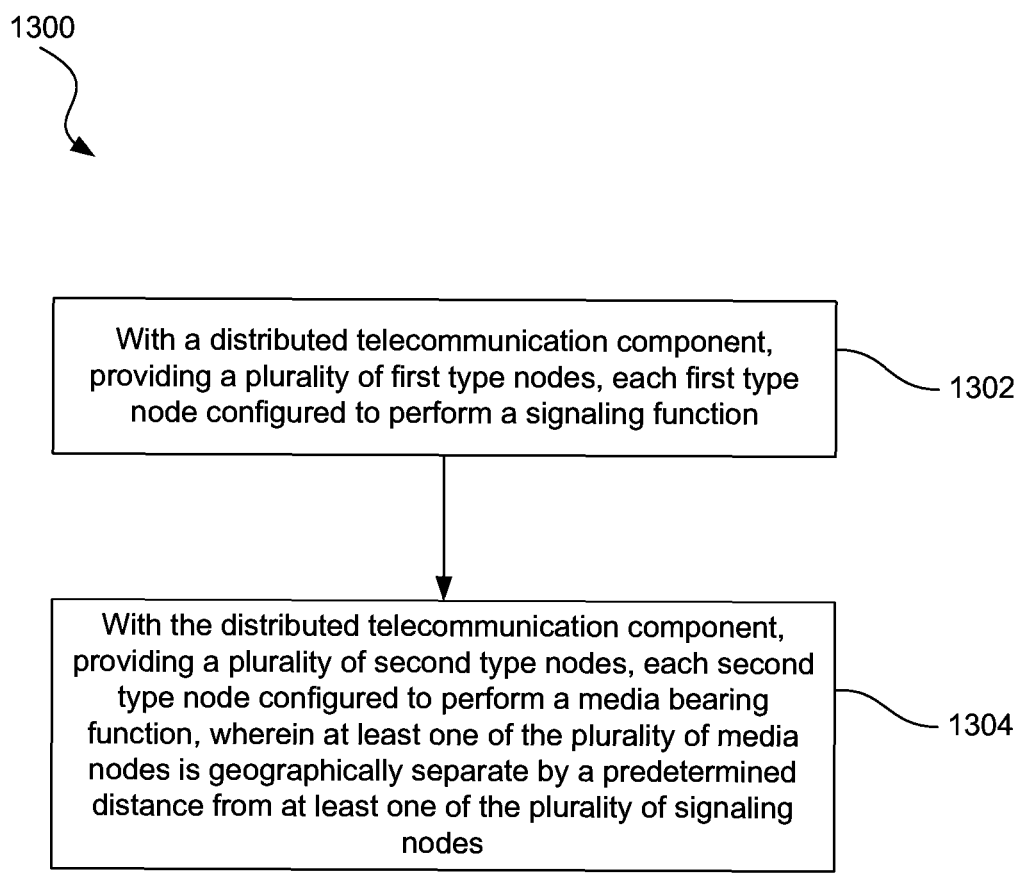
FIG. 13 is a flowchart showing a method for utilizing a geographically separated, distributed telecommunication component, according to one example of principles described herein.

FIG. 13 is a flowchart showing a method for utilizing a geographically separated, distributed telecommunication component. According to the present example, the method 1300 includes a step 1302 for, with a distributed telecommunication component, providing a plurality of first type nodes, each first type node configured to perform a signaling function. The distributed telecommunication component may be, for example, an SBC, a web RTC server, or an MRF server. Other telecommunication components are also contemplated.

The method 1300 further includes a step 1306 for, with the distributed telecommunication component, providing a plurality of second type nodes, each second type node configured to perform a media bearing function. At least one of the plurality of media nodes is geographically separate by a predetermined distance from at least one of the plurality of signaling nodes. Furthermore, as mentioned above, in some examples each of the media nodes may be centrally located. Alternatively, in some examples each of the media nodes may be geographically separated and not centrally located.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a first bearer node of a telecommunication component, utilizing network connections between the first bearer node and a first plurality of control nodes of the telecommunication component to provide media services to the first plurality of control nodes, the bearer node configured to process media data being transmitted between endpoints over a network; and
   with a second bearer node of the telecommunication component, utilizing network connections between the second bearer node and a second plurality of control nodes of the telecommunication component to provide media services to the second plurality of control nodes, the second plurality of control nodes having at least one control node in common with the first plurality of control nodes and at least one control node not common with the first plurality of control nodes.

2. The method of claim 1, wherein the first bearer node includes a media gateway comprising at least a first virtual media gateway and a second virtual media gateway.

3. The method of claim 2, wherein the first virtual media gateway is configured to provide media services to a first one of the plurality of control nodes and the second virtual media gateway is configured to service a second one of the plurality of control nodes.

4. The method of claim 1, wherein the second bearer node includes a media gateway comprising at least a first virtual media gateway and a second virtual media gateway, wherein the first virtual media gateway is configured to provide media services to a first one of the plurality of control nodes and the second virtual media gateway is configured to service a second one of the plurality of control nodes.

5. The method of claim 1, wherein the telecommunication component comprises a distributed Session Border Controller (SBC).

6. The method of claim 1, wherein the telecommunication component comprises a distributed Web Real-Time Communication (WebRTC) component.

7. The method of claim 1, wherein the telecommunication component comprises a distributed Media Resource Function (MRF) component.

8. The method of claim 1, wherein the first bearer node comprises a physical hardware device.

9. The method of claim 1, wherein the first bearer node comprises a Virtual Network Function (VNF) component.

10. The method of claim 1, wherein the first plurality of control nodes and the second plurality of control nodes include both virtual and physical nodes.

11. A system comprising:
    a telecommunication component comprising:
      a plurality of control nodes, each of the control nodes configured to establish communication sessions between endpoints;
      a plurality of bearer nodes, each of the bearer nodes configured to process media data that is transmitted between endpoints, wherein a first one of the plurality of bearer nodes utilizes network connections between the first one of the plurality of bearer nodes and a first set of the plurality of control nodes to provide media resources to the first set of the plurality of control nodes, and a second one of the plurality of bearer nodes utilizes network connections between the second one of the plurality of bearer nodes and a second set of the plurality of control nodes to provide media resources to the second set of the plurality of control nodes, the first set and the second set having at least one common control node, and both the first set and the second set each include an exclusive control node.

12. The system of claim 11, wherein the first one of the plurality of bearer nodes includes a media gateway.

13. The system of claim 12, wherein the media gateway includes a plurality of virtual media gateways.

14. The system of claim 12, wherein there is a one-to-one ratio of virtual machine gateways and control nodes serviced by a first one of the plurality of bearer nodes.

15. The system of claim 11, wherein the telecommunication component comprises one of: a distributed Session Border Controller (SBC), a distributed Web Real-Time Communication (WebRTC) component, or a distributed Media Resource Function (MRF) component.

16. The system of claim 11, wherein a first one of the plurality of bearer nodes is one of: a virtual node or a physical node.

17. The system of claim 11, wherein the plurality of bearer nodes includes at least one physical node and at least one virtual node.

18. A method comprising:
    with a first control node of a telecommunication component, utilizing network connections between the first control node and a first plurality of bearer nodes of the telecommunication component to receive media services from the first plurality of bearer nodes, the control node configured to establish communication sessions between endpoints over a network; and
    with a second control node of the telecommunication component, utilizing network connections between the second control node and a second plurality of bearer nodes of the telecommunication component to receive media services from the second plurality of bearer nodes, the second plurality of bearer nodes having at least one bearer node in common with the first plurality of bearer nodes and at least one bearer node not common with the first plurality of bearer nodes.

19. The method of claim 18, wherein the bearer node in common with the first plurality of media nodes includes a media gateway comprising a first virtual media gateway configured to provide media service to the first control node and a second virtual media gateway configured to provide media service to the second control node.

20. The method of claim 18, wherein the telecommunication component comprises one of: a distributed Session Border Controller (SBC), a distributed Web Real-Time Communication (WebRTC) component, or a distributed Media Resource Function (MRF) component.

* * * * *